United States Patent [19]
Ancin

[11] Patent Number: 5,956,468
[45] Date of Patent: Sep. 21, 1999

[54] DOCUMENT SEGMENTATION SYSTEM

[75] Inventor: Hakan Ancin, Cupertino, Calif.

[73] Assignee: Seiko Epson Corporation, Tokyo, Japan

[21] Appl. No.: 08/782,144

[22] Filed: Jan. 10, 1997

Related U.S. Application Data

[60] Provisional application No. 60/021,674, Jul. 12, 1996, and provisional application No. 60/030,844, Nov. 15, 1996.

[51] Int. Cl.$^6$ .............................. G06K 15/02; G06K 9/34
[52] U.S. Cl. ......................... 395/109; 382/164; 382/165; 382/173; 382/176; 382/180
[58] Field of Search .................................... 382/176, 173, 382/180, 164, 165; 358/462, 467; 395/109

[56] References Cited

U.S. PATENT DOCUMENTS

| | | | |
|---|---|---|---|
| 4,504,969 | 3/1985 | Suzuki et al. | 382/10 |
| 4,553,261 | 11/1985 | Froessi | 382/57 |
| 4,668,995 | 5/1987 | Chen et al. | 358/282 |
| 4,680,803 | 7/1987 | Dilella | 382/9 |
| 4,776,024 | 10/1988 | Katoh et al. | 382/9 |
| 5,073,953 | 12/1991 | Wendijk | 382/9 |
| 5,091,968 | 2/1992 | Higgins et al. | 382/30 |
| 5,121,224 | 6/1992 | Ng et al. | 358/462 |
| 5,129,012 | 7/1992 | Abe | 382/16 |
| 5,159,667 | 10/1992 | Borrey et al. | 395/148 |
| 5,172,422 | 12/1992 | Tan | 382/9 |
| 5,202,933 | 4/1993 | Bloomberg | 382/9 |
| 5,212,739 | 5/1993 | Johnson | 382/9 |
| 5,214,518 | 5/1993 | Kalo | 358/448 |
| 5,237,627 | 8/1993 | Johnson et al. | 382/30 |
| 5,243,445 | 9/1993 | Koike | 358/462 |
| 5,251,273 | 10/1993 | Belts et al. | 382/57 |
| 5,276,742 | 1/1994 | Dasari et al. | 382/46 |
| 5,282,061 | 1/1994 | Farrell | 358/464 |
| 5,299,269 | 3/1994 | Gaboraki et al. | 382/9 |
| 5,311,332 | 5/1994 | Imao et al. | 358/518 |
| 5,321,770 | 6/1994 | Hultenlocher et al. | 382/22 |
| 5,325,444 | 6/1994 | Cass et al. | 382/9 |
| 5,327,257 | 7/1994 | Hrytzak et al. | 358/447 |
| 5,327,262 | 7/1994 | Williams | 358/462 |
| 5,329,385 | 7/1994 | Washio | 358/515 |
| 5,335,290 | 8/1994 | Cullen et al. | 382/9 |
| 5,339,172 | 8/1994 | Robinson | 358/462 |
| 5,341,226 | 8/1994 | Shiau | 358/518 |
| 5,347,374 | 9/1994 | Fuss et al. | 358/522 |
| 5,359,673 | 10/1994 | de La Beaujardiere | 382/40 |
| 5,363,174 | 11/1994 | Magde, Jr. et al. | 355/208 |
| 5,363,209 | 11/1994 | Eschbach et al. | 358/445 |
| 5,369,714 | 11/1994 | Withgott et al. | 382/9 |
| 5,379,130 | 1/1995 | Wang et al. | 358/462 |
| 5,384,863 | 1/1995 | Huttenlocher et al. | 382/9 |
| 5,390,259 | 2/1995 | Withgott et al. | 382/9 |
| 5,404,439 | 4/1995 | Moran et al. | 395/155 |
| 5,410,611 | 4/1995 | Huttenlocher et al. | 382/9 |
| 5,414,538 | 5/1995 | Eachbach | 358/522 |
| 5,428,804 | 6/1995 | Davies | 395/800 |
| 5,437,045 | 7/1995 | Davies | 395/800 |

(List continued on next page.)

FOREIGN PATENT DOCUMENTS 0202425   3/1986   European Pat. Off. ....... H04N 1/415

Primary Examiner—Scott Rogers
Attorney, Agent, or Firm—Michael T. Gabrik

[57] ABSTRACT

A method and apparatus for segmenting a document which has both text and image regions. The method and apparatus implement a technique in which large text pixels and image pixels are identified in a document having a relatively low resolution. The method and apparatus then detect dark text pixels on a light background region of a document and assign segmentation labels to each pixel. The pixel labels are post-processed using a plurality of syntactic rules to correct mislabeling of pixels. This process does not change the visual perception of the image regions in the document. Pixels identified as being in the background region of the document are assigned a white label and pixels identified as being in the text region are assigned a black label. The resulting processed document contains sharp black text and white background, resulting in improved perceptual quality and efficient ink utilization during a printing process.

38 Claims, 17 Drawing Sheets

U.S. PATENT DOCUMENTS

| | | | |
|---|---|---|---|
| 5,442,717 | 8/1995 | Murakami | 382/162 |
| 5,448,380 | 9/1995 | Park | 358/520 |
| 5,450,217 | 9/1995 | Eachbach et al. | 358/518 |
| 5,450,502 | 9/1995 | Eachbach et al. | 382/169 |
| 5,455,875 | 10/1995 | Chevion et al. | 382/311 |
| 5,455,898 | 10/1995 | Mahoney et al. | 395/133 |
| 5,465,167 | 11/1995 | Cooper et al. | 358/468 |
| 5,465,304 | 11/1995 | Cullen et al. | 382/176 |
| 5,479,602 | 12/1995 | Baecker et al. | 395/159 |
| 5,491,760 | 2/1996 | Withgott et al. | 382/203 |
| 5,497,180 | 3/1996 | Kawakami et al. | 347/131 |
| 5,506,918 | 4/1996 | Ishitani | 382/289 |
| 5,513,277 | 4/1996 | Huttenlocher | 382/171 |
| 5,526,444 | 6/1996 | Kopec et al. | 382/233 |
| 5,528,732 | 6/1996 | Klotz, Jr. | 395/106 |
| 5,539,841 | 7/1996 | Huttenlocher et al. | 382/218 |
| 5,548,700 | 8/1996 | Bagley et al. | 395/144 |
| 5,555,362 | 9/1996 | Yamashita et al. | 395/145 |
| 5,555,556 | 9/1996 | Ozaki | 382/173 |

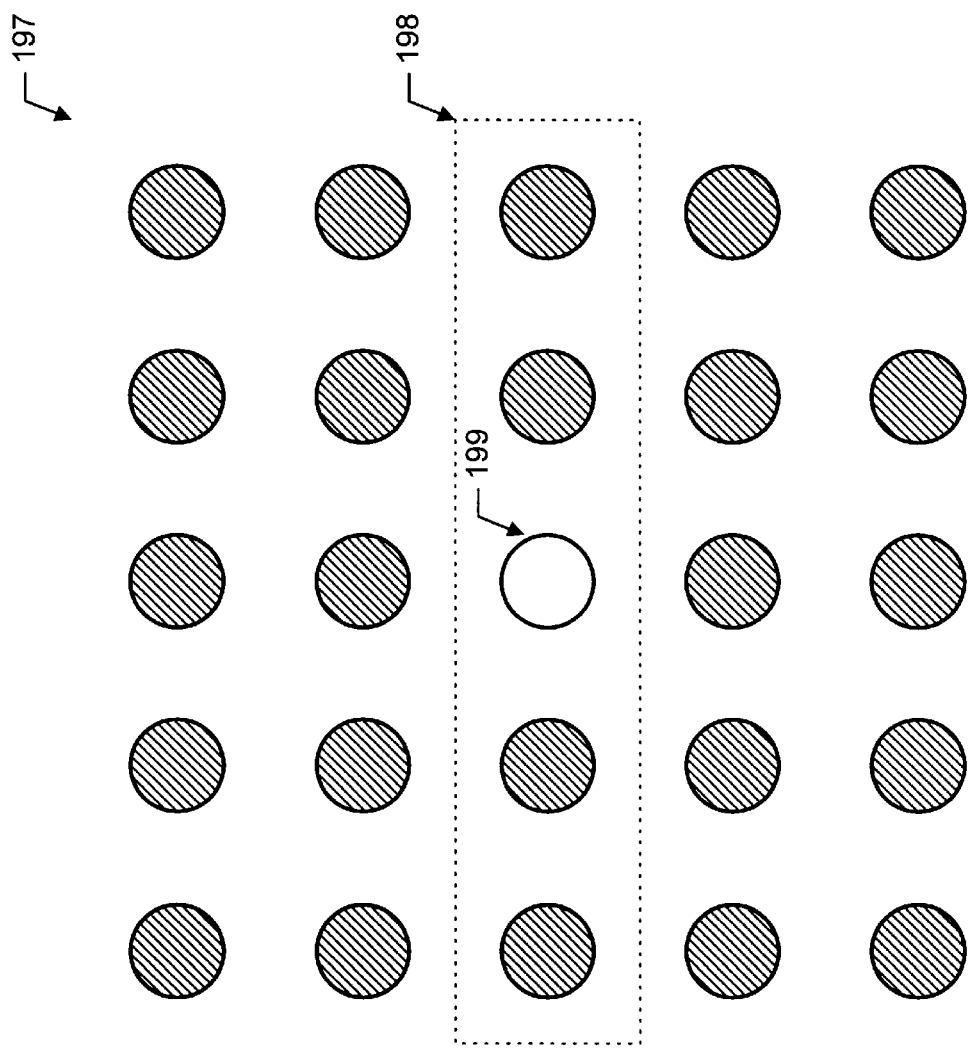

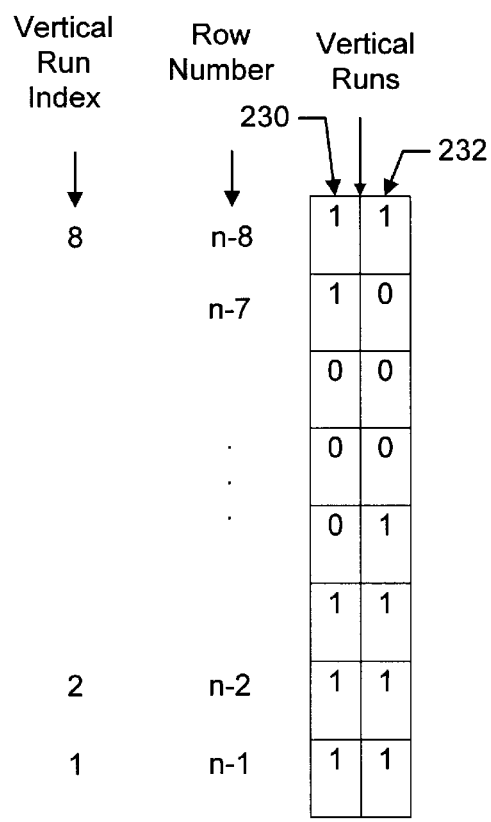
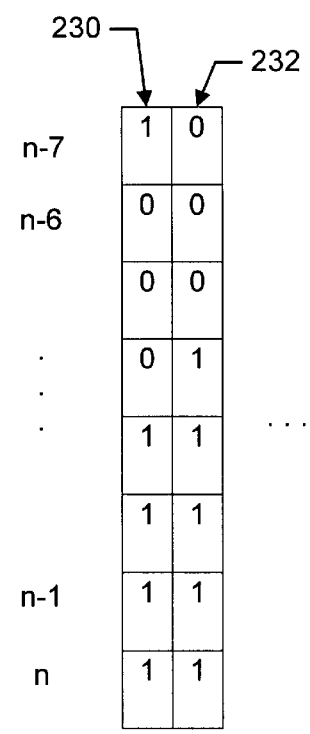
FIG. 10  FIG. 10A

DOCUMENT SEGMENTATION SYSTEM

RELATED APPLICATIONS

This application claims priority benefit under 35 U.S.C. § 119(e) from application Ser. No. 60/021,674, filed Jul. 12, 1996, and application Ser No. 60/030,844, filed Nov. 15, 1996.

FIELD OF THE INVENTION

This invention pertains generally to electronic document processing techniques and more particularly to a method and apparatus for segmenting electronic documents.

Background of the Invention

As is known in the art, a document may be represented in a storage device of a computer or other digital processing device as a matrix of digital data values. A document which includes colors other than black or white is generally referenced to as a color document. To represent a color document electronically, three dimensional values of picture elements or pixels are used. Each pixel value represents a location in a color space such as a red-green-blue (RGB) color space or a cyan-magenta-yellow color space. Other color spaces may also be used.

As is also known, a mixed document refers to a document which contains at least one region of text and at least one image. As used herein, the term image refers to line art and photographs. Color images are often printed using a technique referred to as spatial dithering or more simply dithering. Dithering is a technique for generating an image having many colors with a device, such as a printer, having fewer colors than the image. The colors of the image are simulated by the device by producing groups of closely spaced dots. Images generated in this manner are typically referred to as halftone images.

To produce a hard copy of a mixed color document having a relatively high quality image region, it is desirable to print the color image using the above-described dithering techniques. When a mixed color document includes black text on a white or light background and a color image, it is unnecessary to use dithering techniques when printing the black text regions and the detected background of the mixed color document. Thus, to print only the image region of the mixed document utilizing a dithering technique, it is necessary to identify or segment the image and text regions of a mixed document. After the image and text regions of the mixed document are segmented, the text and image regions can be processed separately prior to printing the document.

One prior art technique for segmenting a mixed document to locate text regions of the document utilizes rule-based methods which are applied to the entire mixed document. One problem with this approach, however, is that mixed color documents are relatively large thus requiring relatively large amounts of memory for document processing. This makes processing of the entire document at one time relatively difficult. This is especially true when it is desirable to perform such processing on a personal computer (PC) having a relatively small amount of random access memory (RAM).

As is also known, there is a trend to provide PCs which include scanners and other devices to allow input of color documents and color-images from devices such as digital cameras, for example. A PC having color peripheral devices such as a color scanner and a color printer coupled thereto, can operate as a color reproduction system. Such PCs, however, are still typically provided having relatively small amounts of RAM. It is thus relatively difficult for such PCs to process mixed color documents for printing using segmentation techniques which operate on the entire mixed color document.

Further difficulties in segmenting a mixed color document arise when the mixed color document is stored in the memory of a processing device by feeding the mixed color document through a color scanner. During the scanning process, a variety of factors can affect the quality of the scanned image. For example, a document may be skewed when fed through the scanner. Furthermore, scanners having relatively small color gamuts are only capable of representing a relatively small dynamic range of colors. The smaller dynamic range of colors increases the difficulty of distinguishing between text and image regions of a mixed color document. Thus, a variety of factors including but not limited to document skewing, limited dynamic range of colors and other characteristics of the scanner or the scanning process, increase the difficulty of segmenting mixed color documents which have been scanned by a document scanner.

Other problems are presented by documents printed on relatively thin pages having printing on both sides thereof. For example, mixed color documents printed on one side of a relatively thin page, such as thin magazine page for example, may contain bleed-through artifacts from a document printed on the reverse side of the page. Such pages may also have a background color which is off-white rather than white. Such artifacts related to the quality of the paper on which the document is printed also increase the difficulty of segmenting the document. Moreover, the variations in colors which occur within mixed color documents further increases the difficulty of locating text in a mixed color document. Such problems are further increased by scanning the relatively thin pages. Thus, in addition to problems presented by a scanner, paper quality as well as printing quality also affect the ability of a processing system to segment a mixed color document.

It would, therefore, be desirable to provide a technique for extracting text from a mixed color document. It would also be desirable to provide a relatively high quality document printout by printing only the image regions of a mixed color document via a dithering technique. It would also be desirable to reduce color cartridge usage in the printing of mixed color documents. It would also be desirable to provide a document segmentation technique which is relatively insensitive to skewing and limited scanner color dynamic range resultant from a scanning process. It would also be desirable to provide a document segmentation technique which is relatively insensitive to bleed through artifacts and color variations resultant from paper quality and printing quality.

SUMMARY OF THE INVENTION

In accordance with the present invention, an apparatus for segmenting documents includes a pixel classifier to place each of a plurality of pixels a row of a document in one of a text class, a background class and an image class, a pixel grouper to group together contiguous pixels in a like class and a post processor to determine the validity of the classes into which the pixels are placed by the pixel classifier by applying a plurality of syntactic rules to the document one row at a time. With this particular arrangement, a real time syntactic rule-based document segmentation system is provided which extracts black text from white or light background regions of a mixed color document. The pixel classifier classifies the pixels on a given row of a document into one of text, background, and image classes. The postprocessor verifies the validity of the pixel classes. During the verification process, successive pixels within the same classes are grouped together by computing run lengths and a set of syntactic rules are applied to the pixel sequence to confirm the validity of their classes. The post-processor operates iteratively on each of the image rows until none of the pixels in the rows change their labels. Furthermore, since the system operates on sequences of pixels, incorrect pixel classifications are typically confined to relatively small image or text regions of the document and thus have a relatively small impact on the appearance of a printed mixed color document. The post processor corrects pixel misclassifications committed by the pixel classifier. Such pixel misclassification results, for example, in image pixels being labeled as text pixels or background pixels, and text and background pixels being labeled as image pixels. Text represented by a relatively large font is not segmented by the algorithm and is instead treated as an image region of the document. Once the text and image regions of the mixed color document are segmented, the image regions alone can be printed using a dithering technique and document text can be printed with a relatively high quality without the use of the dithering technique. This results in relatively rapid printing of a mixed color document having clear, sharp text characters in the text region of the document and relatively high quality images in the image region of the document. The system operates on individual pixels which enables the system to operate on skewed images and also facilitates recognition of black characters on a white or a light color background of a scanned mixed color document. The system operates on a predetermined number of rows of a document rather than on an entire document. This results in an efficient use of memory which enables the system to segment mixed color documents having a relatively large size while utilizing a relatively small amount of memory. The system is thus appropriate for use in processing systems, such as personal computer systems, having relatively small amounts of memory.

In accordance with a still further aspect of the present invention a method for segmenting a document includes the steps of detecting image and large text pixels on a preview document, computing a triplet in a predetermined color space for a white point of a media (e.g. a sheet of paper) on which the document is printed, computing a triplet in the color space for a black point of the media, using the white point triplet to generate a table of compensation values to compensate for the white color of the media, using the compensated values to classify pixels into one of: (1) an image class; (2) a text class; and (3) a background class and post-processing the segmentation labels based on the runlengths of the segmentation labels to correct any pixel misclassifications which occur during the classification step. With this particular technique, a method for segmenting a mixed color document is provided. Classification of white or light regions as background regions increases the speed of the printing process since such regions need not be printed when printing on a white recording media. The predetermined color space may correspond, for example, to a red, green, blue (RGB) color space and the table of compensation values may correspond to values computed in lightness and chromaticity axes a & b (L*a*b*) color space and be provided as L*a*b* values. In a preferred embodiment, the document being processed is scanned twice. The first scanning provides a relatively low resolution document which can be stored utilizing a relatively small amount of memory. The original document is scanned a second time to provide a relatively high resolution document. Since the method utilizes document rows rather than entire document regions, the technique does not have global document information. For example, the location of the image regions and large text regions in the scanned document cannot be determined just by having certain number of rows. Thus, to provide such information, the relatively low resolution document (e.g. a document having 60 or 90 dots per inch) is utilized. By processing the relatively low resolution image, the large size text regions are identified and image regions can be predicted in the high resolution document. The large size text and image regions can thus be predicted in the high resolution mixed document by processing the relatively low resolution image. This information is used during labeling of pixels in a row of the high resolution document. Thus, once the large text and image regions of the mixed document have been identified, the pixels in the high resolution document are classified and labeled. Since the scanning process and the segmenting process are both row based, each row of the high resolution scanned document can be processed as it is scanned, thus resulting in a pipelined document segmentation operation. The post-processing step corrects errors which can occur during the classification step. Such classification errors result, for example, in image pixels being labeled as text pixels or background pixels, and text pixels being labeled as image pixels. Large text characters are classified as images and thus are not segmented from the image portions of the document. Once the text and image regions of the mixed document are segmented, the image regions alone can be printed using a dithering technique and document text can be printed with a relatively high quality without the use of the dithering technique. This reduces the use of color cartridges because the text regions of the document can be printed by a printer using true black ink and detected background regions do not require any ink at all. Furthermore, by processing individual sequences of pixels, bleeding artifacts which exist in the background portion of the document can be removed.

BRIEF DESCRIPTION OF THE DRAWINGS

The foregoing features of the invention, as well as the invention itself may be more fully understood from the following detailed description of the drawings, in which:

FIG. 8A depicts the application of a 5×5 kernel to a sequence of pixels having a color label;

FIG. 10 shows the vertical runs for a pair of pixel positions in a row; and

FIG. 10A illustrates a pair of vertical runs updated with the pixel labels of a row.

DESCRIPTION OF THE PREFERRED EMBODIMENTS

Figure 1:
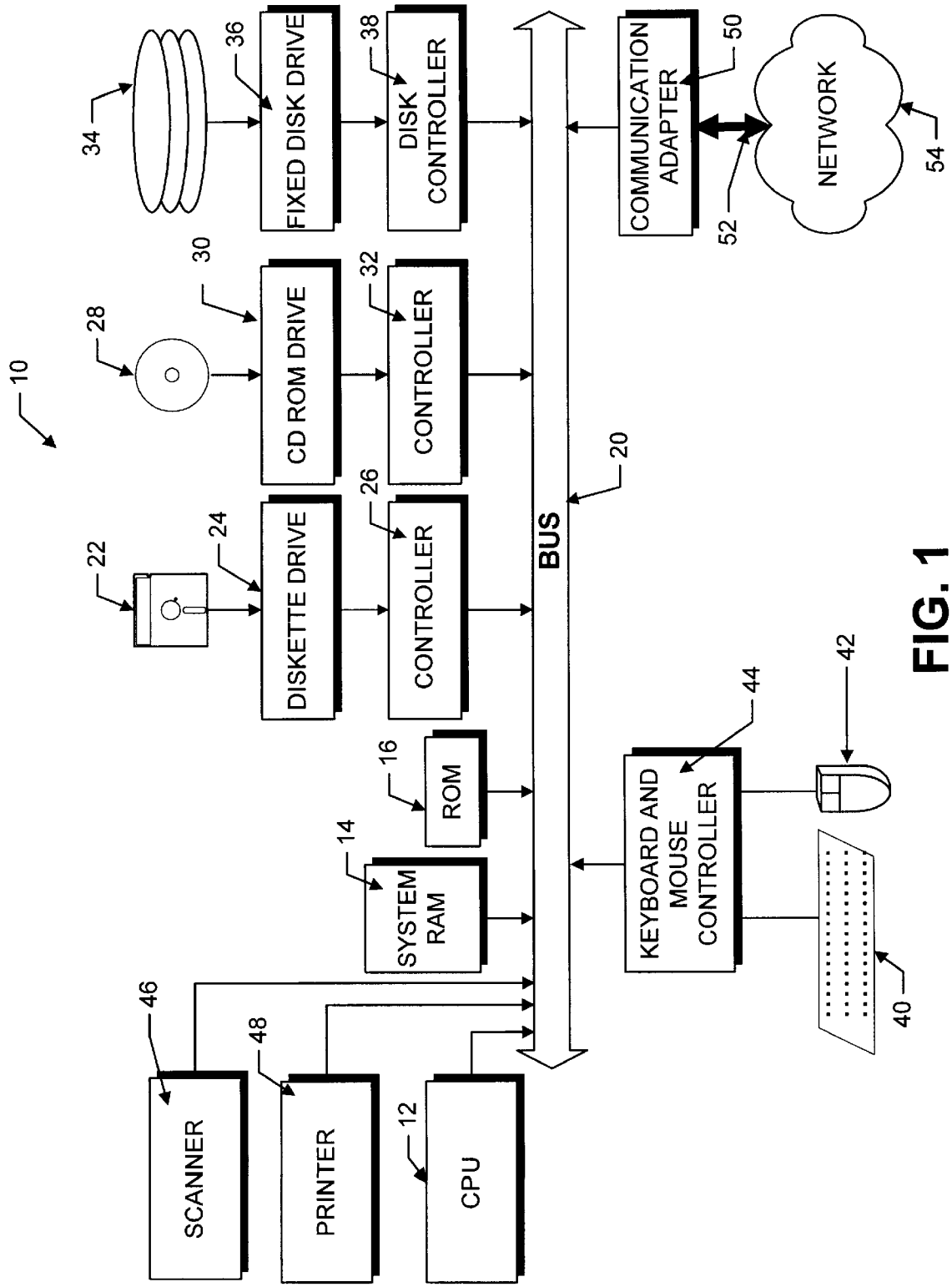
FIG. 1 is a block diagram of a computer system adapted for use with the present invention.

Referring now to FIG. 1, a computer system 10 on which the invention may be implemented is shown. Computer system 10 may be provided, for example, as an IBM compatible computer or an equivalent computer system. The exemplary computer system 10 of FIG. 1 is for descriptive purposes only. Although the description may refer to terms commonly used in describing particular computer systems, the description and concepts equally apply to other processing systems, including systems having architectures dissimilar to that shown in FIG. 1.

Computer system 10 includes a central processing unit (CPU) 12, which may be provided, for example, as a conventional microprocessor, a random access memory (RAM) 14 for temporary storage of information, and a read only memory (ROM) 16 for permanent storage of information. Each of the aforementioned components are coupled to a bus 20. Operation of computer system 10 is generally controlled and coordinated by operating system software. The operating system controls allocation of system resources and performs tasks such as processing, scheduling, memory management, networking, and I/O services, among things. Thus, an operating system resident in system memory and executed by CPU 12 coordinates the operation of the other elements of computer system 10.

Also coupled to bus 20 is a non-volatile mass storage device which may be provided as a diskette 22. Diskette 22 is insertable into a diskette drive 24 which is, in turn, coupled to bus 20 by a controller 26. Similarly, a compact disc (CD) ROM 28 is insertable into a CD ROM drive 30 which is, in turn, coupled to bus 20 by a controller 32. A hard disk 34 is typically provided as part of a fixed disk drive 36 which is coupled to bus 20 by a disk controller 38.

Data and software may be provided to and extracted from computer system 10 via removable storage media such as diskette 22 and CD ROM 28. For example, data values generated using techniques to be described below in conjunction with FIGS. 2–10 may be stored on storage media similar to media 22, 28. The data values may then be retrieved from the media 22, 28 by CPU 12 and utilized by CPU 12 to perform color printing of scanned or stored mixed color documents. Alternatively, CPU 12 may simply store such data values in ROM 16. Alternatively still, computer software useful for processing images including mixed color documents for purposes of color scanning and color printing by peripherals such as color scanner 46 and color printer 48 may be stored on storage media similar to media 22, 28. Such computer software may be retrieved from media 22, 28 for immediate execution by CPU 12 or by processors included in one or more peripherals such as scanner 46 and printer 48. CPU 12 may retrieve the computer software and subsequently store the software in RAM 14 or ROM 16 for later execution.

User input to computer system 10 may be provided by a number of devices. For example, a keyboard 40 and a mouse 42 are coupled to bus 20 by a controller 44. Scanner 46 also functions as an input device and may be provided, for example, as a hand held scanner or a page scanner coupled to bus 20. As mentioned above, scanner 46 preferably includes the capability of scanning mixed color documents which may later be printed by the color printer 48 which is also coupled to the bus 20.

Whether the scanner 46 is hand held or a page scanner, the scanner 46 includes a light source, a light sensitive device such as an array of charge couple devices (CCD, array) and software controlled electronics which sequentially actuate the elements of the CCD array. Scanners having resolutions of 400 dpi and higher are available with up to two hundred and fifty-six levels of grey and twenty-four bits of color resolution available. Thus, scanners offer a wide variety of choices and performance capabilities and are powerful input devices when mixed documents or other prepared data in visual form are to be entered into the computer system 10.

When a mixed document embodied in a hard copy medium such as paper or film is provided to the scanner 46, the scanner 46 converts both the text portion and the image portion of the document into electrical signals. Such conversion is typically accomplished via movement of a light beam over a surface of the hard copy media having the image disposed thereon. The light beam may be moved over the surface either by hand or automatically and using the array of light sensitive devices convert the reflective light into electrical pulses which form the electrical signals. The electrical signals thus provided may be fed to a processor such as CPU 12.

It should be noted that scanner 46 may itself include a processor and memory to which the electrical signals may alternatively be provided. Alternatively still, printer 48 may include a memory and processor and thus the scanner signals may be provided directly to printer 48.

In system 10 the processor 12 provides the scanner signals to the printer 48 and the printer 48 prints the image. In the case of mixed documents, processor 12 identifies the text and image portions of the document and processes the text and image portions separately to efficiently utilize processing and memory resources. Thus, with scanner 46 and printer 48 coupled as shown, computer system 10 can perform the same function as a copy machine capable of re-producing both color images, black and white images and mixed color documents.

The scanner and printer transfer functions typically distort the color signals and preferably the transfer function implemented by processor 12 compensates for the effects of the transfer functions of the scanner 46 and printer 48. Thus, it is desirable to implement a function via a processor such as CPU 12 which is the inverse of the scanner and printer transfer functions. Such implementation includes the storage of a calibration values in a memory of system 10. Such calibration values may be computed using a variety of techniques including those techniques set forth in co-pending application Ser. No. 08/678,884, filed Jul. 12, 1996, entitled METHOD AND APPARATUS FOR AUTOMATIC COLOR CORRECTION assigned to the assignee of the present invention and incorporated fully herein by reference.

As mentioned above, the printer color gamut is typically smaller than the scanner color gamut and this is particularly true in relatively inexpensive printers. Similarly, relatively inexpensive scanners typically have smaller color gamuts than relatively expensive scanners. However, since it is not possible to print colors which cannot be scanned, those colors outside the scanner color gamut can simply be ignored. Computer system 10 also includes a communications adapter 50 which allows the system to be interconnected to a local area network (LAN) or a wide area network (WAN), schematically illustrated by bus 52 and network 54. Thus, data and computer program software can be transferred to and from computer system 10 via adapter 50, bus 52 and network 54.

Figure 2:
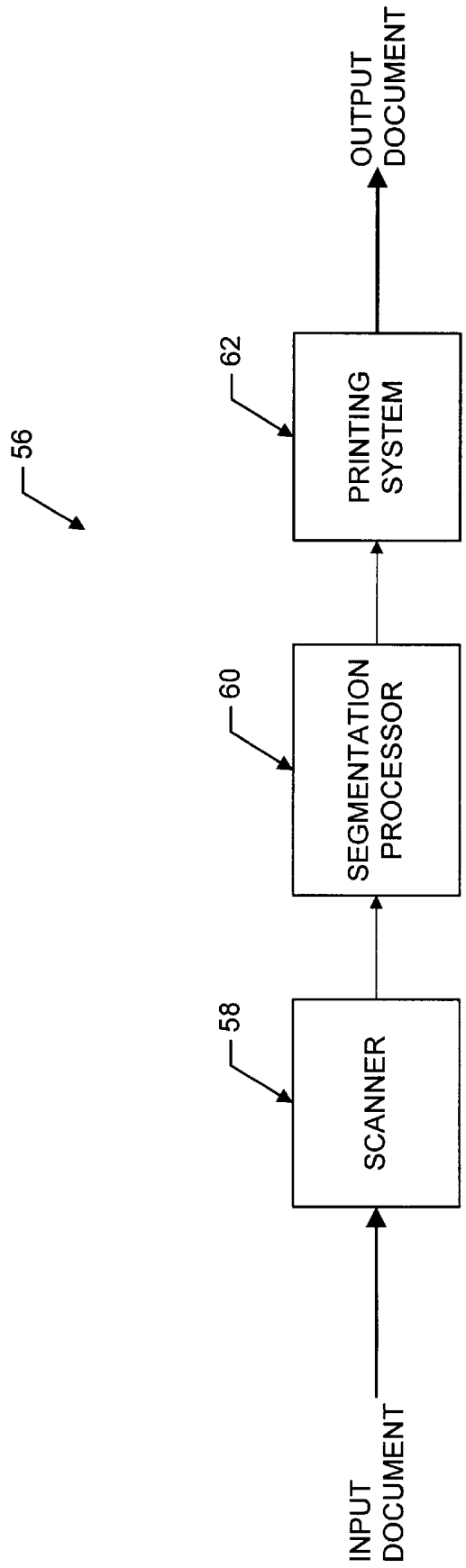
FIG. 2 is a block diagram of a document reproduction system.

Referring now to FIG. 2, an image processing system 56 includes a scanner 58 which receives an input document and converts the input document into a stream of digital bits which are fed to a segmentation processor 60. Segmentation processor 60 segments the text, background and image portions of the document and subsequently provides signals to a printing system 62. Printing system 62 includes apparatus for receiving the signals from segmentation processor 60 and for printing a printed mixed color document. It should be noted that segmentation processor 60 may be provided as part of scanner 58 or alternatively segmentation processor may be provided as a independent processor which is separate and apart from scanner 58. Alternatively still, segmentation processor may be provided as part of printer 60.

The operation of segmentation processor 60 will be described in detail below in conjunction with FIGS. 3–10. Suffice it here to say that segmentation processor 60 operates on mixed color documents to segment image, text and background regions of the mixed color document. This allows printing system 62 to provide an output document of relatively high quality by halftoning only the image regions of the mixed color document.

Terminology

Before describing the processing performed on mixed documents, some introductory concepts and terminology are explained. In the description provided hereinbelow, examples are sometimes used in which a mixed color document of interest is said to be scanned with a resolution of 360 dots per inch (dpi) from pages having a width of 8.5 inches and a length of 11 inches. The size of the image regions in the mixed color documents are typically around 34 megabytes (Mb). In other instances, processing will be referred to as occurring on images having a particular resolution (e.g. 720 dpi or 60 dpi). Those of ordinary skill in the art will appreciate that the techniques described herein are applicable to documents having various resolutions and image sizes. Documents are also sometimes described or referred to as a high resolution document. A high resolution document refers to a document having a resolution typically of about 360 dpi or greater. Reference is also sometimes made to a low resolution document also sometimes referred herein as a preview document. A preview document is a document having a resolution of 90 dpi or less. Those of ordinary skill in the art should appreciate, of course, that the terms high resolution and low resolution may also be used in a relative sense. That is, a low resolution document may be any document having a resolution which is less than a resolution of a document from which it is derived. It should also be noted that in some applications it is possible that a document having a resolution of 90 dpi is considered a high resolution document while a document having a resolution of 30 dpi is considered a low resolution document.

In the processing to be described below, pixels are sometimes identified with labels. The labels identify pixels as being white, black or color. Thus, reference may sometimes be made to a "white pixel." This terminology denotes a pixel having a white label assigned thereto. Likewise, reference to a "black pixel" or a "color pixel" denotes pixels having black or color labels respectively assigned thereto.

Also, in conjunction with such document resolutions, documents are sometimes said to be divided into two dimensional arrays of pixels, each represented by a digital word. The arrays are taken to be a particular size but one skilled in the art will recognized the techniques described herein are applicable to various sizes and shapes of arrays.

In other instances, groups of pixels in an image are selected for simultaneous consideration. One such selection technique is called a local window or a kernel. For example, if a 5×5 summary of pixels is to be considered, that group is said to be in 5×5 local window. The local window may be centered over the pixel in the center of the window. It is often necessary to process every group of pixels which can be formed from an image. In those instances, the local window can be thought of as sliding across the image because the local window is centered above one pixel then moves in a center above another pixel, and then another, and so on. Those of ordinary skill in the art will again appreciate that various sizes and shapes of local windows may be used.

In other instances reference is sometimes made to an operation occurring in a particular color space such as a red-green-blue (RGB) color space or a lightness and chromaticity axes a & b (L*a*b*) color space. Those of ordinary skill in the art will appreciate of course that other color spaces may also be used and that when such other color spaces are used, it may be necessary to modify in some ways the particular operations or steps being performed. Such modifications are well known to those of ordinary skill in the art.

It should also be noted that although the examples of processing described herein below sometime refer to pixel sequences which are part of a row of a document, the same concepts and techniques can be applied to pixel sequences which are part of a column of a document. Thus, in some applications it may be advantageous to process pixel sequences taken from columns of pixels while in other applications it may be desirable to utilize pixel sequences taken from rows of pixels. In still other applications, it may be advantageous to process both vertical and horizontal pixel sequences.

Figure 3:
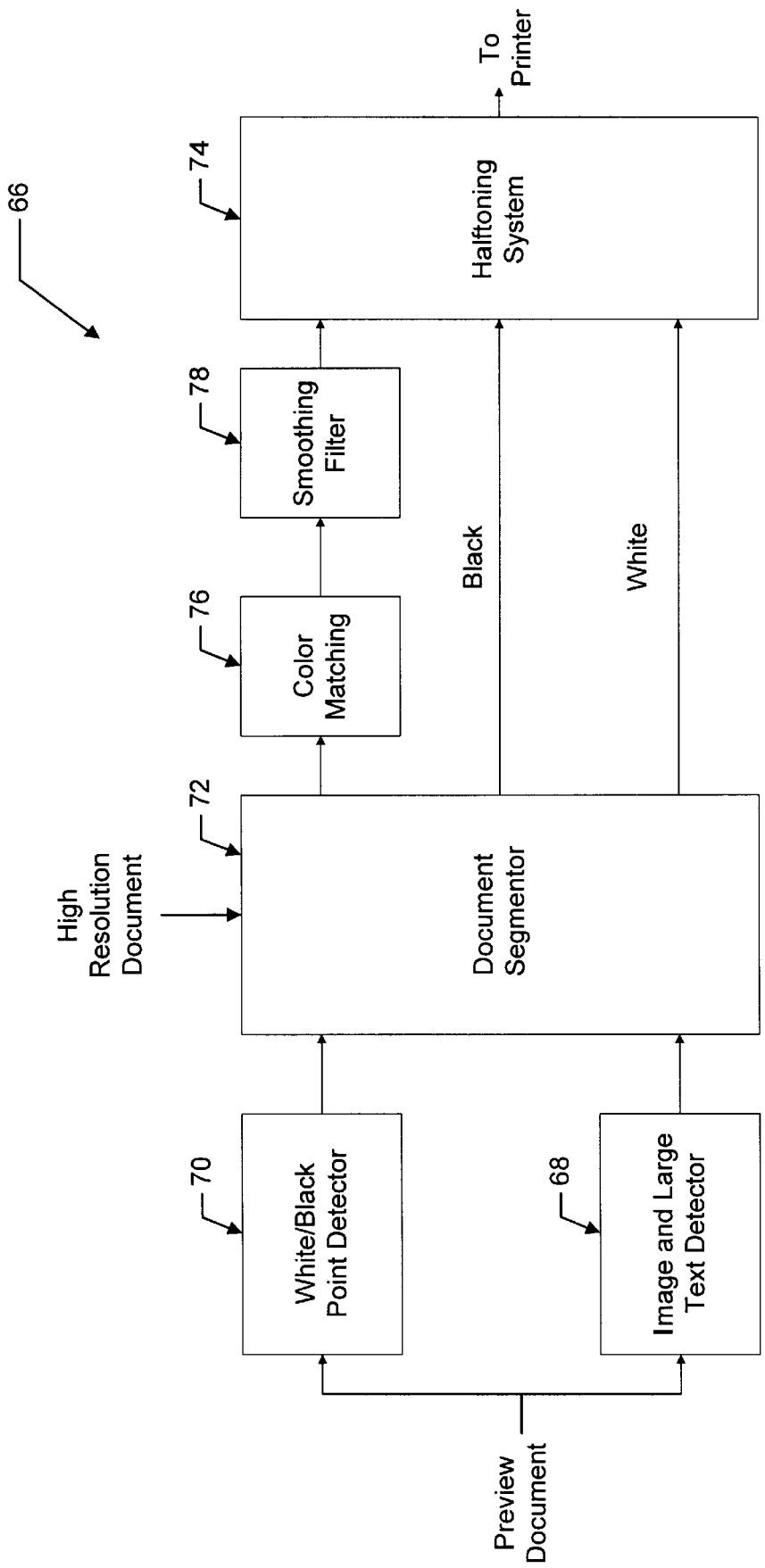
FIG. 3 is a block diagram of another document segmentation system.

Referring now to FIG. 3, a document reproduction system 66 includes an image and large text (ILT) detector 68 and a white/black point (WBP) detector 70. ILT and WBP detectors 68, 70 each receive a preview document fed thereto. In a preferred embodiment, the preview document is generated by scanning the document in low resolution such as 90 dpi or 60 dpi. Alternatively, the preview document may be provided by receiving a high resolution document and sub-sampling the document to provide an image having a resolution which is less than the high resolution image. For example, the high resolution document may be provided having a resolution of 720 dots per inch (dpi) the sub-sampled or preview document may be provided having a resolution typically of about 60 dpi.

ILT detector 68 detects image pixels and large text pixels on the preview document. ILT detector 68 is coupled to a document segmentor 72. As will be described below in conjunction with FIGS. 4–10, document segmentor 72 utilizes row based segmentation methods to segment text regions from image regions in a mixed color document. Such row based segmentation methods do not have sufficient global information to allow a reliable detection of large characters and to allow a reliable determination of whether a segmented area belongs to an image region or a text region of the document. To thus overcome this difficulty, ILT detector 68 operates on the preview document fed thereto and generates global information on the mixed color document.

In particular, ILT detector 68 provides to document segmentor 72 the locations of image pixels and large text pixels in the preview document. This results in a reduction in the number of false segmentations performed by document segmentor 72. The particular manner in which ILT detector 68 operates will be described in detail below in conjunction with FIG. 5.

WBP detector 70 detects white and black points of the medium on which the document is printed. The medium may be provided, for example, as a paper sheet having a relatively light color such as white or off white. If WBP detector 70 determines that the document being processed does not contain text having a relatively dark color on a background having a relatively light color, then document segmentor 72 does not process the high resolution document.

Assuming WBP detector 70 determines that the document being processed contains text having a relatively dark color on a background having a relatively light color, then WBP detector 70 identifies white and black points of the document. In particular WBP detector 70 computes RGB triplets for the white and black points of the recording media. The white point is used to generate a table of L*a*b* values which are compensated for the white of the recording media.

Document segmentor 72 receives the L*a*b* values and the large text and image location information from ILT and WBP detectors 68, 70 and utilizes the information to classify pixels in the high resolution document into one of three classes: (1) a document image class, (2) a document text class and (3) a document background class. Document segmentor 72 then post-processes the segmentation labels by applying a set of syntactic rules to the run-lengths of these labels and by simple kernel based operations. The particular manner in which the pixels are classified and in which the post processing is accomplished will be described in detail below in conjunction with FIGS. 5–10.

Suffice it here to say that the post-processing operations performed by segmentor 72 correct errors which may have occurred during classification of pixels. Due to these errors, image pixels may be labeled as text pixels or background pixels, text or background pixels may be labeled as image pixels, etc. It should be noted that, text characters having a relatively large point size are not segmented by the document segmentor 72 but rather are treated as images. Large text characters are defined as characters which satisfy one of the following conditions: (1) a connected component having size larger then 800 pixels; or (2) a connected component having a height longer than 16 pixels; or (3) a connected component having a width larger than 16 pixels and having a height less than 4 pixels. All connected components satisfying one of these conditions are classified as images. Those of ordinary skill in the art will appreciate, of course, that other techniques may also be used to detect large text characters and that the parameters listed in the above conditions may be modified for efficient processing in particular applications.

Document segmentor 72 then provides the pixel information labeled as color C, black B and white W to a halftoning system 74. Color pixels are fed to the halftoning system 74 via a color matcher 76 and a smoothing filter 78 while the black and white pixels are fed directly to halftoning system 74 for printing. It should be noted that halftoning system 74 preferably prints the black labeled pixels in the text region of the mixed color document with true black ink and without the use of dithering techniques. On the other hand, halftoning system 74 prints the color pixels using dithering techniques. Thus halftoning system 74 generates a hard copy of a mixed color document having a relatively high quality image regions and text regions having a relatively clear, sharp appearance.

FIGS. 4–6, 7, 8 and 9 are a series of flow diagrams showing the processing performed by apparatus such as apparatus 10 (FIG. 1) to segment a document. The rectangular elements (typified by element 82), herein denoted "processing blocks," represent computer software instructions or groups of instructions. The diamond shaped elements (typified by element 88), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required the particular apparatus. It should be noted that many routine program elements, such as initialization of loops and variables and the use of temporary variables are not shown.

Figure 4:
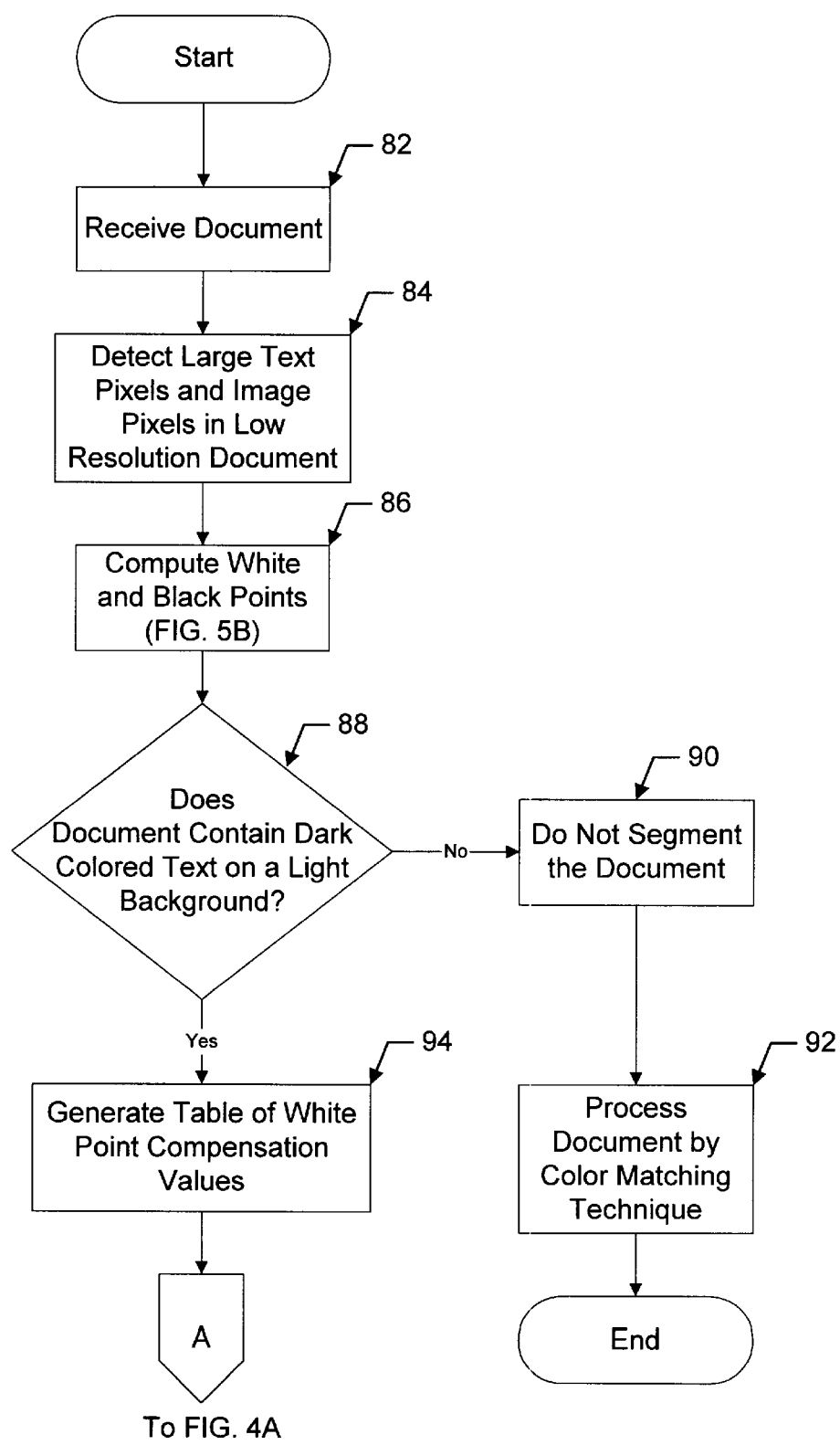
FIGS. 4 and 4A are a series of flow diagrams illustrating the steps performed by a processor to segment a document.
Figure 4A:
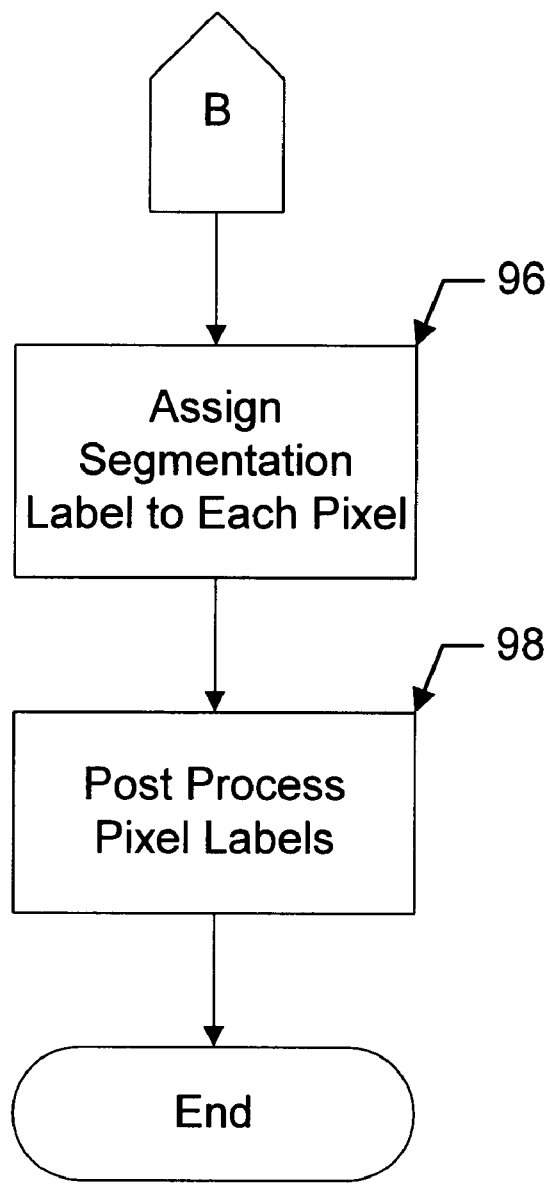

Turning now to FIG. 4 as shown in step 82 a document processing system receives a document. The document may be received, for example, by scanning the document through a scanner such as scanner 58 (FIG. 2). Alternatively, the document may be pre-stored in a storage device such as a volatile or non-volatile memory of a computer system. In a preferred embodiment, the document is provided to a document processing system by first scanning the document into memory as a relatively low resolution document. For example, the document may be scanned at a resolution of 60 or 90 dpi. The document may also be scanned a second time at a higher resolution e.g. 360 dpi. Thus, in the approach the document may be scanned twice. The first scanning operation provides a low resolution document and the second scanning operation provides a relatively high resolution document. The high resolution document may be processed in accordance with steps 96 and 98 to be discussed below while the scanning process is taking place. Thus, the system can operate in a pipeline fashion. A low resolution document is sometimes referred to herein as a preview document can be acquired by scanning the document with a resolution which is smaller than the resolution of the high resolution image. The high resolution document may be provided, for example, having a resolution of 360 dpi while the low resolution document may be provided having a resolution of 90 dpi.

Since the segmentation techniques described herein operate on selected document rows, rather than on entire documents at one time, it is relatively difficult to detect large characters or text (i.e. characters printed using a relatively large point size) within the document and it is also relatively difficult to determine if a segmented area is part of an image region or a text region. To overcome this difficulty, the preview document is utilized to provide information regarding the general location of large text and image regions within the documents. This information is used to predict the location of image regions in high resolution mixed documents. This approach reduces the number of false segmentations which occur in document processing. Thus, as shown in processing blocks 84 and 86, using the low resolution image, large text and image pixels in the low resolution document are detected, and white and black points of the document are computed.

Next, as shown in decision block 88, a decision is made as to whether the document contains text having a relatively dark color on a background having a relatively light color. If the document does not contain dark colored text on a light background then processing flows to steps 90 and 92 where the document is not segmented and is instead processed by color matching techniques.

If in decision block 88 a decision is made that the document contains text having a relatively dark color on a background having a relatively light color, then processing proceeds to step 94 in which the document's white point is used in conjunction with a colorimetric XYZ profile for a scanner to generate a table of L*a*b* values that are compensated for the document's white point. Processing then proceeds to step 96 where a segmentation label is assigned to each pixels of a high resolution image based upon the L*a*b* value of the pixel.

The labels black (B), white (W), and color (C) are used to mark text, background, and image regions of the mixed color document. If the document has been scanned, then as a result of the scanning operation pixels that are surrounding a character tend to blur and have RGB values lighter then the character. Such pixels may also be marked with a color (C) label. The assignment of segmentation labels to each pixel is achieved using a relatively simple multilevel thresholding technique that utilizes L* value and saturation (S) which is defined as:

$$S=a^2+b^2$$

One example of a multilevel thresholding scheme will be described below in conjunction with FIG. 6.

Next, processing flows to processing step 98 where pixel labels are post processed using a set of syntactic rules developed to determine the validity of the pixel labels. The particular rules will be discussed in detail below in conjunction with FIGS. 8 and 9.

Figure 5:
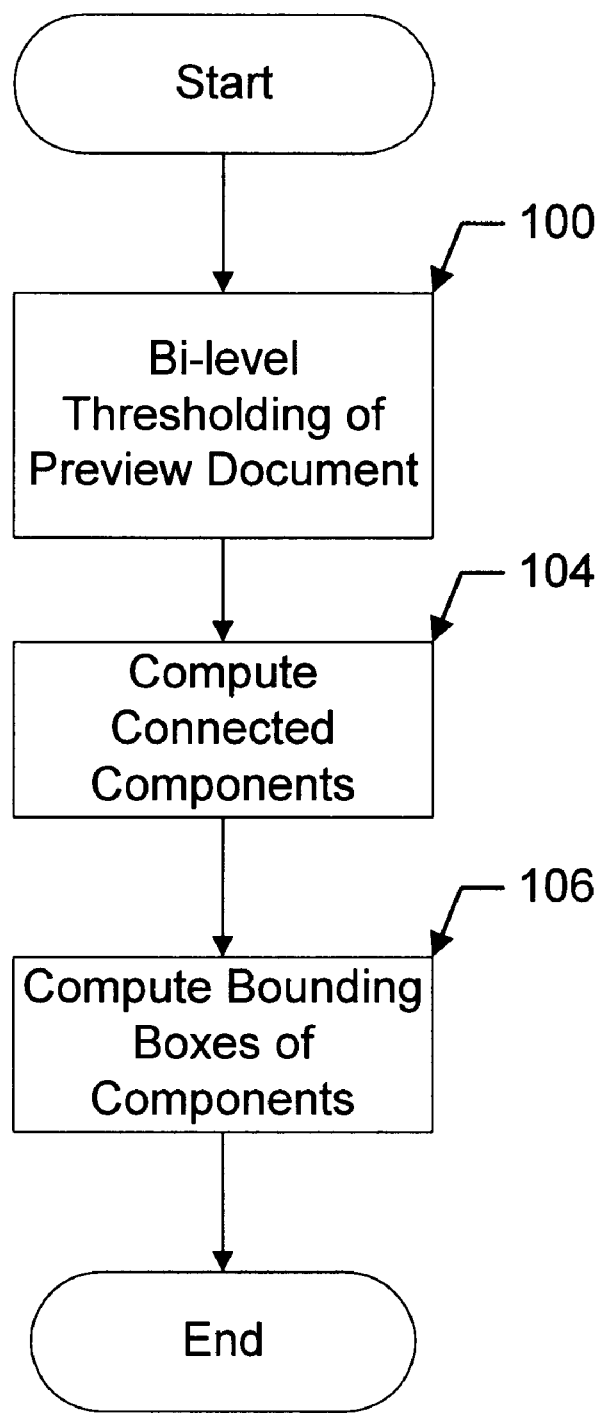
FIG. 5 is a flow diagram illustrating the steps performed by a processor to detect image and large text regions in a document.

Referring now to FIG. 5, a method for processing a low resolution or preview mixed color document includes processing step 100 in which a bi-level thresholding operation is performed on the low resolution document. During the multilevel-thresholding operation of the high resolution document, all black pixels of the high resolution document are mapped to corresponding locations in a low resolution document.

Figure 5A:
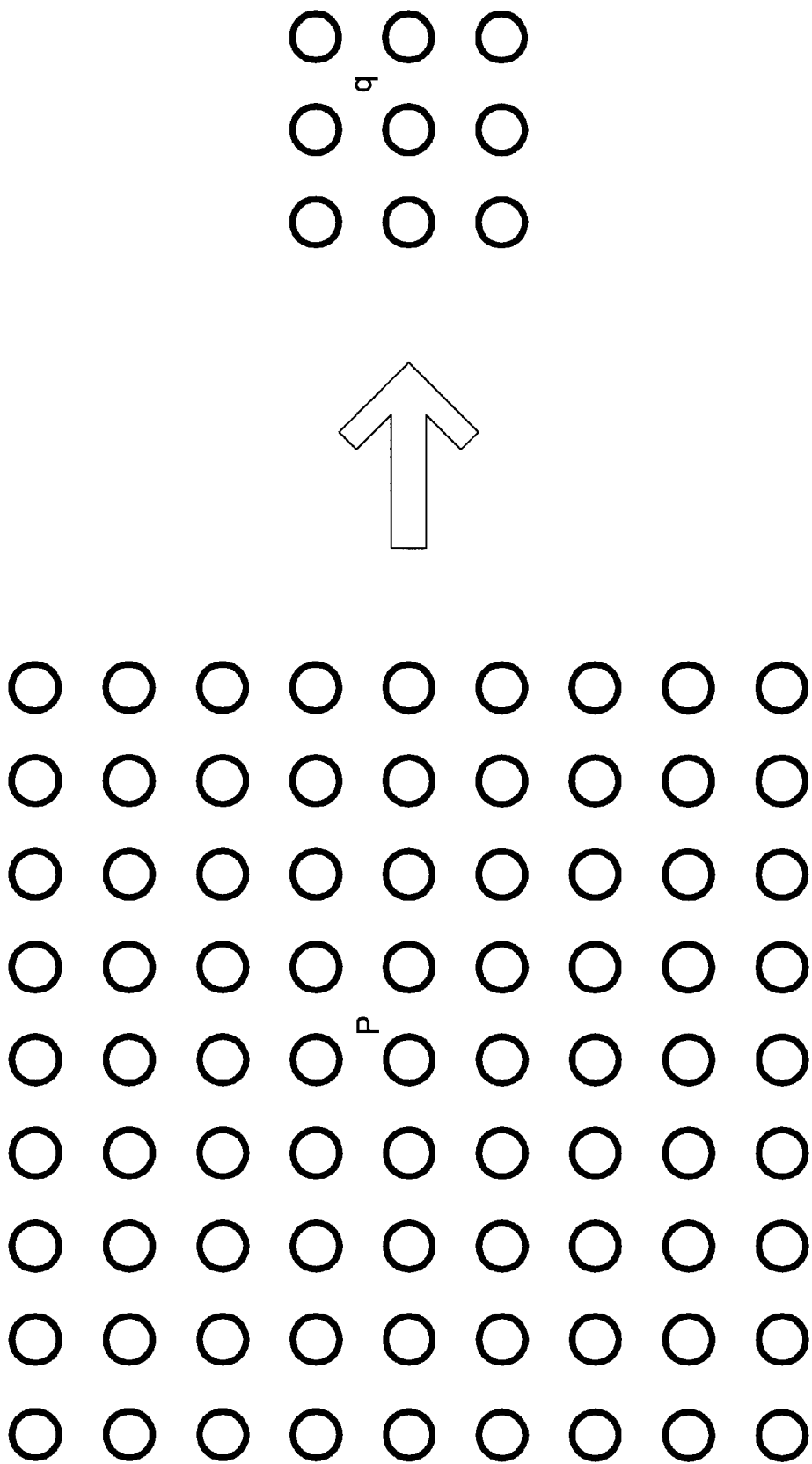
FIG. 5A is a pair of pixel maps illustrating mapping from a neighborhood in a high resolution image to a neighborhood in a low resolution image.

Referring briefly to FIG. 5A, all black pixels, p, in a high resolution image are mapped to corresponding locations, q, in a low resolution image. In the low resolution image, the pixels surrounding the mapped pixel are visited to determine the validity of the black label. If an image pixel, IMG, exists in a 3×3 window in the low resolution image, the black label is converted to a color label, otherwise the black label is preserved. This operation tries to prevent black labels occurring in image regions and in large text regions of the document, thus reducing false segmentation and execution time of the row based segmentation technique.

The thresholding operation partitions the document into black (foreground) and white (background) regions. The foreground regions may correspond to both image and text regions. To distinguish image from text regions in the foreground region of the document, processing proceeds to step 104 in which a connected components technique, well known to those of ordinary skill in the art, is implemented on pixels located in the foreground region of the document.

The distinction between image and text regions is made based upon a variety of factors including but not limited to a size criterion. Image regions are typically comprised of relatively large components, whereas text regions typically are comprised of relatively small connected components. The size criterion may also be used as a basis for eliminating large characters, such as titles. It should be noted, however, that the size criterion alone is insufficient to distinguish all of the image regions in a given document. Thus, processing step 106 computes bounding boxes of the connected components.

More features and characteristics for the regions may then be computed from the bounding boxes of the connected components. Component dimensions are computed from bounding boxes and components with large dimensions and sizes are labeled as image, IMG. The distance between bounding boxes of the connected components is also used to discriminate between large text and image regions. All these features can be used to detect the image regions and large characters in the low resolution scanned images.

Once the document is processed and locations of large text and image regions within the document are predicted and related pixels are labeled as image pixels, IMG, processing ends.

Figure 5B:
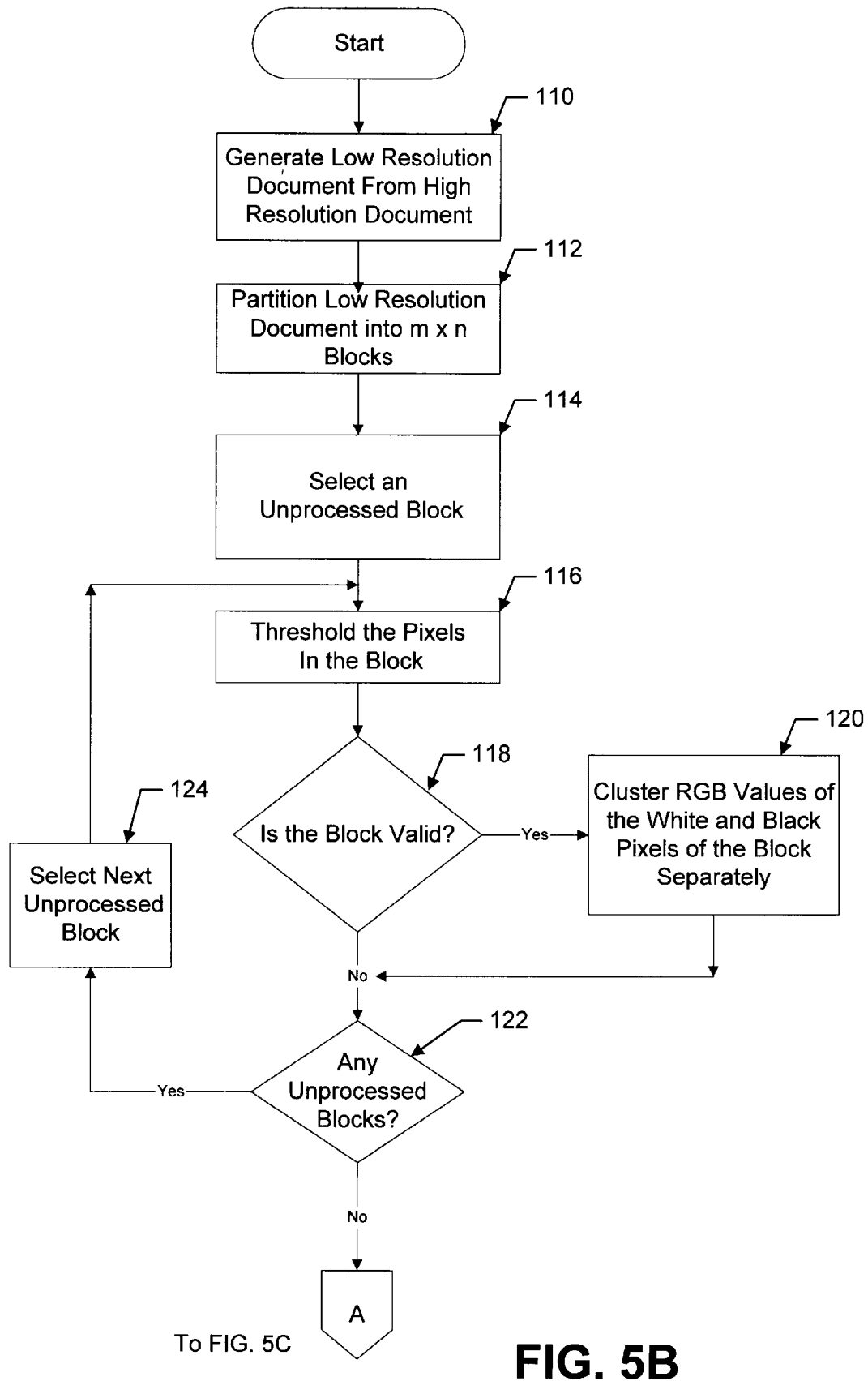
FIGS. 5B and 5C are a series of flow diagrams illustrating the steps performed by a processor to compute a white point and a black point of a recording media.
Figure 5C:
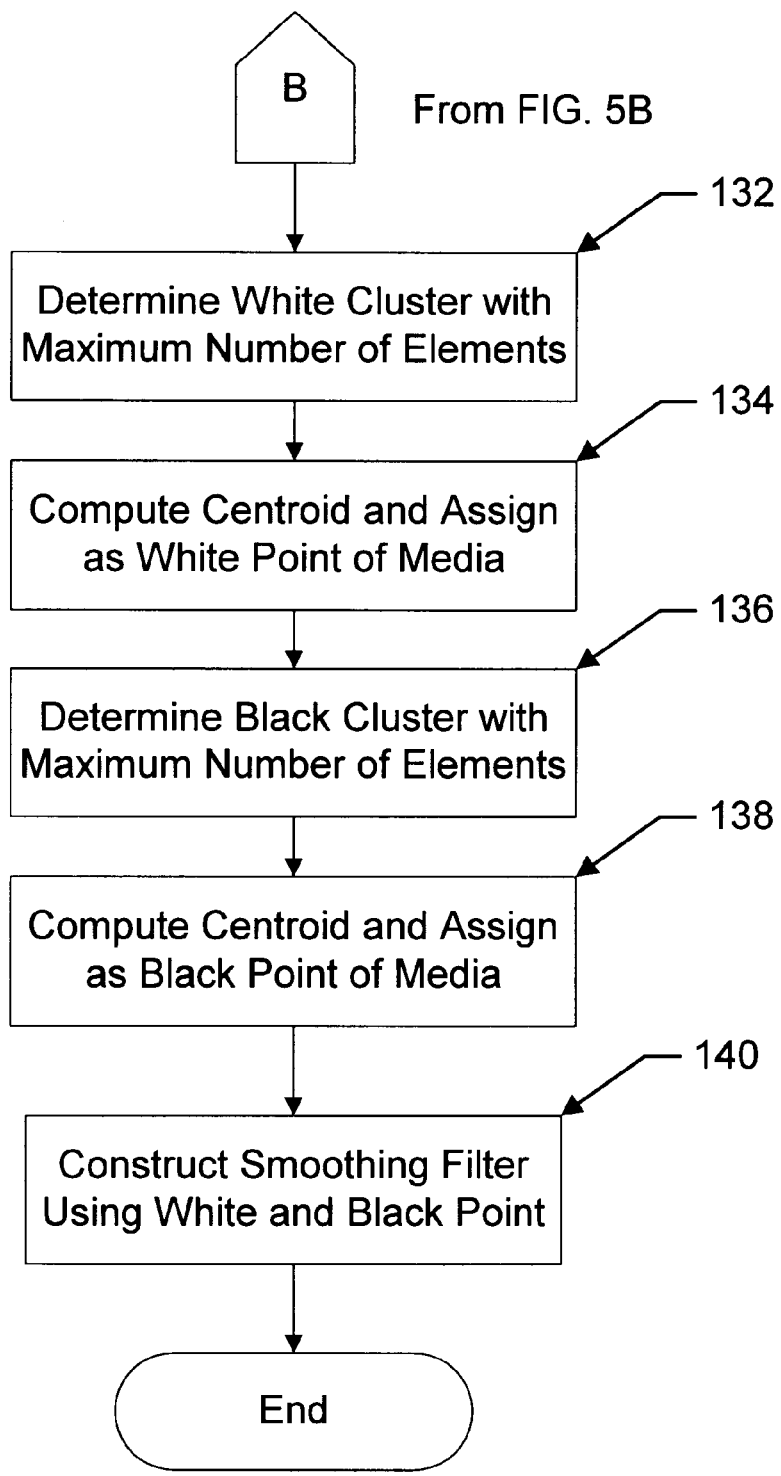

FIGS. 5B, and 5C show processing performed to compute a document white point and a document black point. In a preferred embodiment, the process is used to compute an RGB triplet for a white point of the scanned document. As shown in step 110, the computation of white and black points optionally begins by generating a low resolution or preview document from a high resolution document. In a preferred embodiment, the low resolution document is generated by a scanning process. The low resolution document may also be provided by downsampling scanned high resolution document.

It should be noted that increasing the resolution of the preview document increases the accuracy of the triplets but also increases the execution and scanning times. The low resolution image of the document will be referred to herein below as the preview of the document or simply the preview document. Thus, a trade-off must be made between processing speed and accuracy. It should also be noted that reference made to a preview document or a low resolution document does not imply any particular resolution. It merely indicates that a document having a resolution lower than a high resolution document is being used.

The white and black points of the paper are computed if the page on which the document is printed contains text having a relatively dark color on a background having a relatively light color. One technique for performing this operation is described in co-pending patent application Ser. No. 08/747,069 entitled SYSTEM AND METHOD FOR DETECTING THE BLACK AND WHITE POINTS OF A COLOR IMAGE filed Nov. 8, 1996, assigned to the assignee of the present invention and incorporated fully herein by reference. If this condition is not satisfied, the document is not segmented. To determine if the condition is satisfied, next, the preview of the document is partitioned into m×n blocks as shown in processing step 112 (FIG. 5B). Next, as shown in steps 114, 116 an unprocessed block is selected and the values of each of the pixels in the block are compared to threshold values in a simple multilevel thresholding scheme.

Based on the results of the comparisons, the pixels are labeled with one of black, white or color labels.

In decision step 118, a decision is made as to whether the selected block is valid (i.e. is the condition of relatively dark colored text on a relatively light colored background satisfied for this block). This determination is made by considering the number of white and black pixels in the selected block. In one particular embodiment, for example, in a block having 32 columns and 32 rows of pixels (i.e. a 32×32 block) 85 of the pixels must be black and 170 of the pixels must be white in order for the block to be satisfactory for processing. Generally those of ordinary skill in the art will appreciate, of course, that the particular number of black and white pixels required in a block for the block to be considered valid may be selected in accordance with the particular application.

If a block contains a sufficient number of black and white pixels, it is assumed that the block contains both light background and text and the block is identified as a valid block and processing proceeds to step 120. In processing block 120, pixels within the valid block are clustered. During the clustering step, the pixels with white labels and black labels are clustered separately based upon their RGB values.

If in decision block 118 a determination is made that the block is not valid, then processing proceeds to decision block 122. Decision block 122 and processing block 124 implement a loop in which each of the blocks in the low resolution document are processed in accordance with steps 116, 118 and 120.

After processing all valid blocks, processing proceeds to processing blocks 132 and 134 in which the cluster (among all white clusters) with the maximum number of elements is determined and its centroid becomes the triplet for the document's white point. Similarly, in processing blocks 136, 138 the cluster among all black elements with the maximum number of elements is determined and its centroid becomes the triplet for the document's black point.

As shown in processing block 140, the black and white points are used to construct a sigmoid. This sigmoid is used to construct a filter that is applied after row based segmentation on pixels having a label corresponding to a color label C. This filter pulls down low RGB values to (0, 0, 0) and pulls up high RGB values to (255, 255, 255). For any RGB triplet, if the triplet does not become (0, 0, 0) or (255, 255, 255), then triplet value is preserved. This operation smoothes the contouring effects which may result from the segmentation operation but does not change the hue of the pixel.

Figure 6:
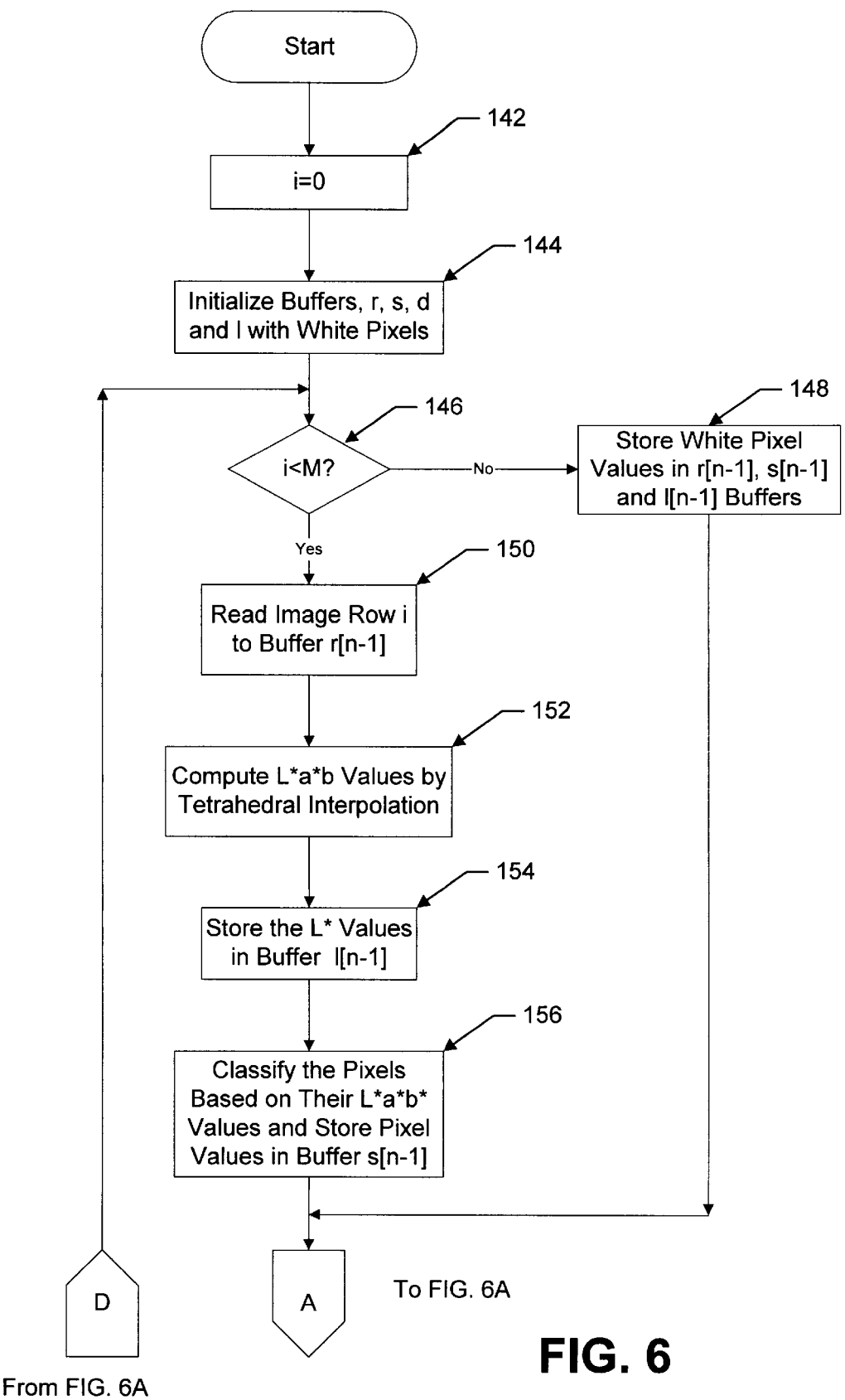
FIGS. 6 and 6A are a series of flow diagrams illustrating the steps performed by a processor to segment a document.
Figure 6A:
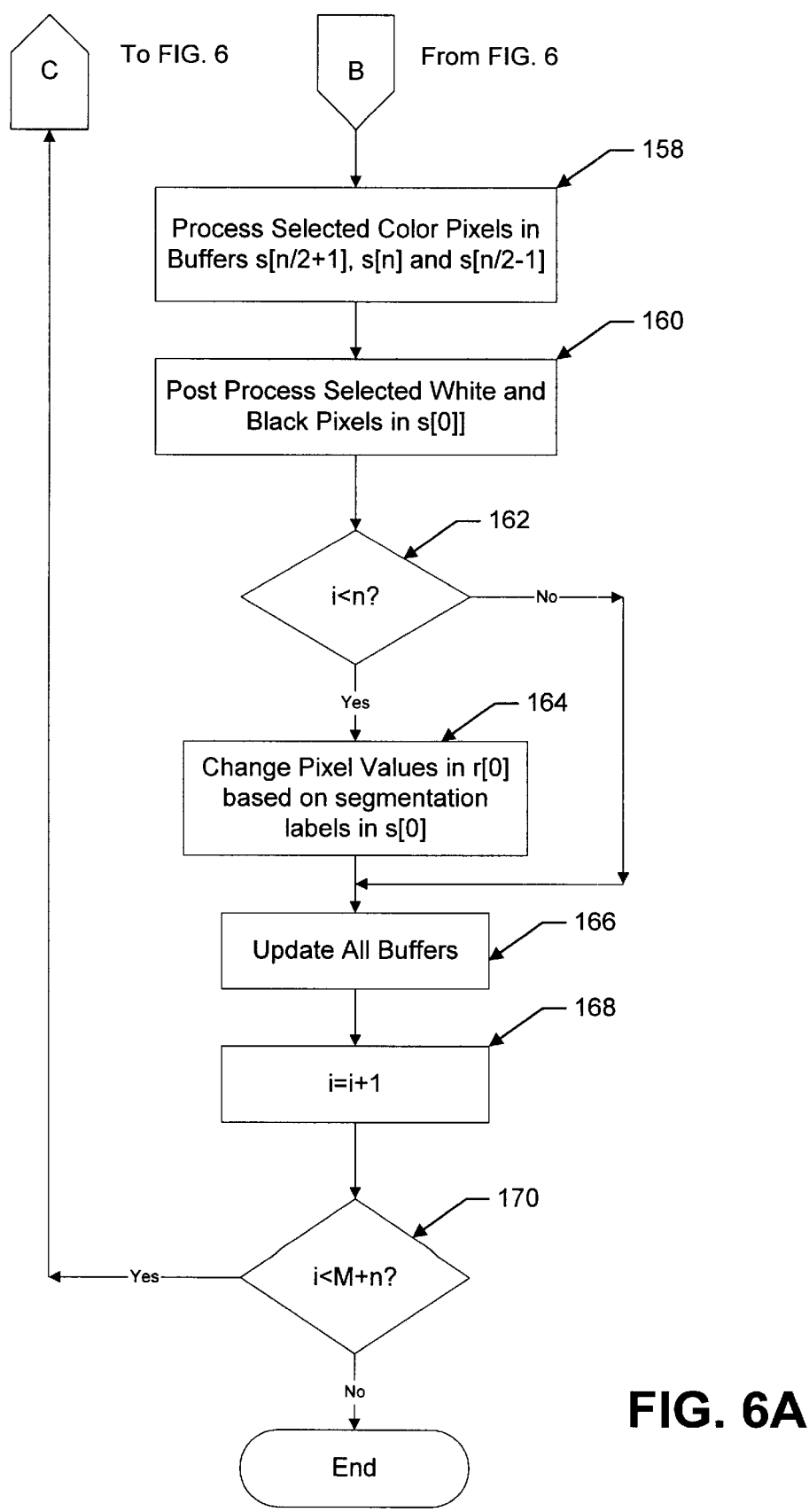

Referring now to FIGS. 6 and 6A, the document segmentation process for an image having dimensions M×N includes initialization steps 142, 144 in which a counter and a plurality of memory buffer arrays r, s, d and l are initialized. It is assumed that the scanned document is surrounded by white boundary pixels for this reason buffers in 144 are initialized with white pixels.

Figure 7:
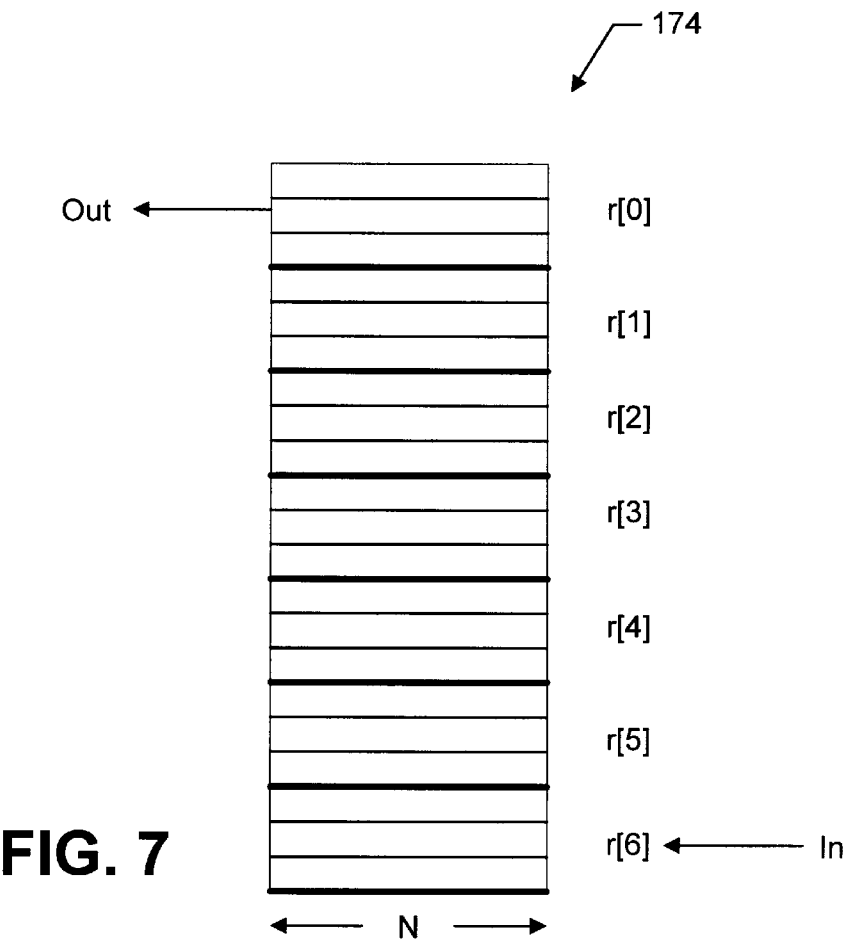
FIG. 7 is diagrammatical view of a buffer which contains RGB values for a predetermined number of successive image rows.
Figure 7A:
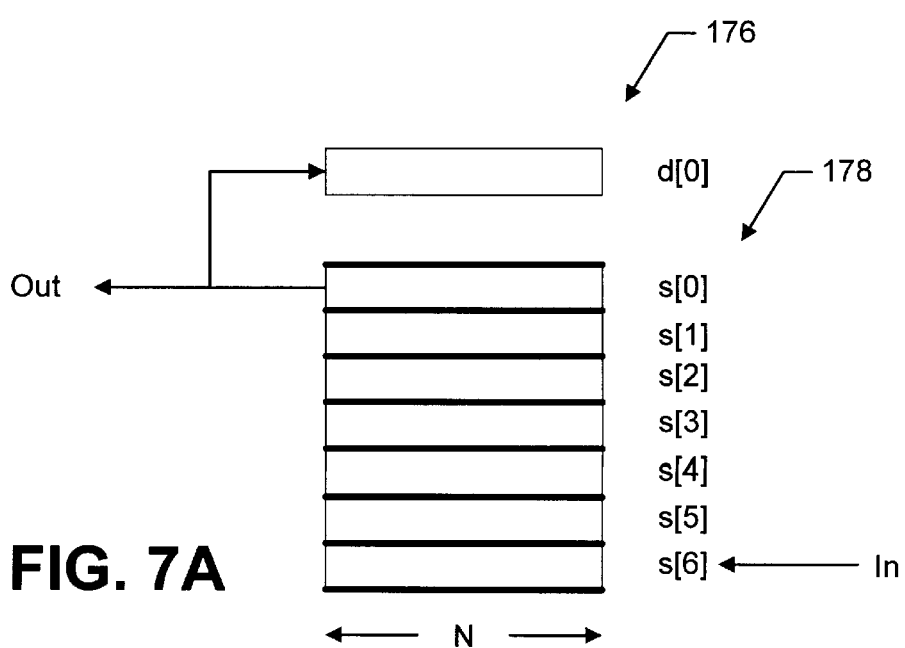
FIG. 7A is diagrammatical view of a buffer which contains pixel segmentation labels for the image rows stored in the RGB buffer of FIG. 7.

Referring briefly to FIGS. 7, 7A, memory buffers 174, 176, 178 respectfully designated r, d and s used to segment a document in accordance with the present techniques are illustrated. FIG. 7 illustrates buffer 174 designated r contains pixel RGB values for n successive image rows. In this particular example r buffer 174 is shown to hold seven successive image rows in buffer rows r[0]–r[6]. FIG. 7A illustrates buffer 178 designated s. The s buffer 178 has stored therein pixel segmentation labels for the same image rows stored in the rows of the r buffer 174. Thus, in this example, s buffer 178 has stored in locations s[0]–s[6] thereof, pixel segmentation labels for the same image rows stored in rows r[0]–r[6] of the r buffer 174. Buffer 176 designated d contains the segmentation labels of the row most recently pushed out of s buffer 178.

As mentioned above, the processing techniques of the present invention are facilitated by the use of four buffer arrays respectively designated r, s, d and l. Buffers r, s and d are shown in FIGS. 7, 7A. The structure of the l buffer which holds the pixel luminance L* values is same as that of the s buffer 178. Thus buffer l includes seven rows l[0]–l[6].

If the image height and width are denoted by M and N, respectively, the dimensions of the buffers r, s, and d are 3n×N, n×N, and N, respectively. In this particular example, minimum memory requirements for each pixel in buffers r, s, d, and l are eight bits, two bits, two bits and eight bits, respectively. Since there are only three different labels, two bits are sufficient to keep the label of a pixel. The total memory requirement for the buffers s, r, d, and l may thus be computed as:

$$3n*N*8+n*N*2+n*N*8+N*2=(34nN+2N) \text{ bits}.$$

Referring again to FIGS. 6 and 6A, after the index i and memory buffers r, s, d and l are initialized, processing proceeds to decision block 146 which determines if all of the M rows of the image have been processed. If all of the rows have been read then processing proceeds to step 148 where white pixel, boundary pixel, values are stored in the r, s and l buffers and processing proceeds to step 158. If all the rows have not yet been processed then processing proceeds to step 150 where the $i^{th}$ image row is read into row r[6] of r buffer 174.

Next, processing proceeds to step 152 where L*a*b* values for pixels of r[6] are computed via a tetrahedral interpolation technique. The document's white point is used in conjunction with a colorimetric XYZ profile for the scanner to generate a table of L*a*b* values that are compensated for the document white. Next, as shown in processing step 154 the L* values are stored in the l buffer (not shown) in location [n-1].

Next, as shown in step 156 the pixels are classified in accordance with their L*a*b* values and the pixel labels are stored in the s buffer 178 in s buffer location s[n-1].

As mentioned above, a segmentation label is assigned to a pixel of high resolution image based on its L*a*b* value. The labels black (B), white (W), and color (C) are used to mark text, background and image regions. As a result of the scanning operation, pixels that are surrounding a character get blurred and have RGB values lighter than the character. These pixels may also be marked by the color label C.

The classification process may be accomplished using a relatively simple multilevel thresholding technique which utilizes L* value and saturation, S, which is defined as $$S=a^2+b^2$$

The L* values of a row are maintained in a buffer until the row is pushed out of the r buffer 174. The following multilevel thresholding scheme is used to classify a pixel p:

if (L*(p)>$T_W$ and S(p)<$T_{SW_1}$) or (L*(p)>$T_{W_2}$ and S(p)<$T_{SW_2}$)

then pixel label is W else if ((L*(p)<$T_{B_1}$ and S(p)<$T_{SB_1}$) or (L*(p)<$T_{B_2}$ and S(p)<$T_{SB_2}$)) and there isn't exist any image pixel, IMG, in the corresponding 3×3 pixel window in the preview image then pixel label is B else
    pixel label is C The relation between thresholds defined above are given as follows:

$T_{W_2} < T_{W_1}$;
$T_{SW_2} < T_{SW_1}$;
$T_{B_1} < T_{B_2}$; and
$T_{SB_1} < T_{SB_2}$.

Thresholds given above are determined empirically on color ramps that are scanned by the scanner of the interest. The above-described labeling process is relatively fast but prone to classification errors, (e.g. image pixels may be mislabeled as text or background, or vice versa). To correct these errors, post-processing operations are implemented on the labels as will next be explained in detail in conjunction with FIGS. 8, 9 and 10.

Figure 8:
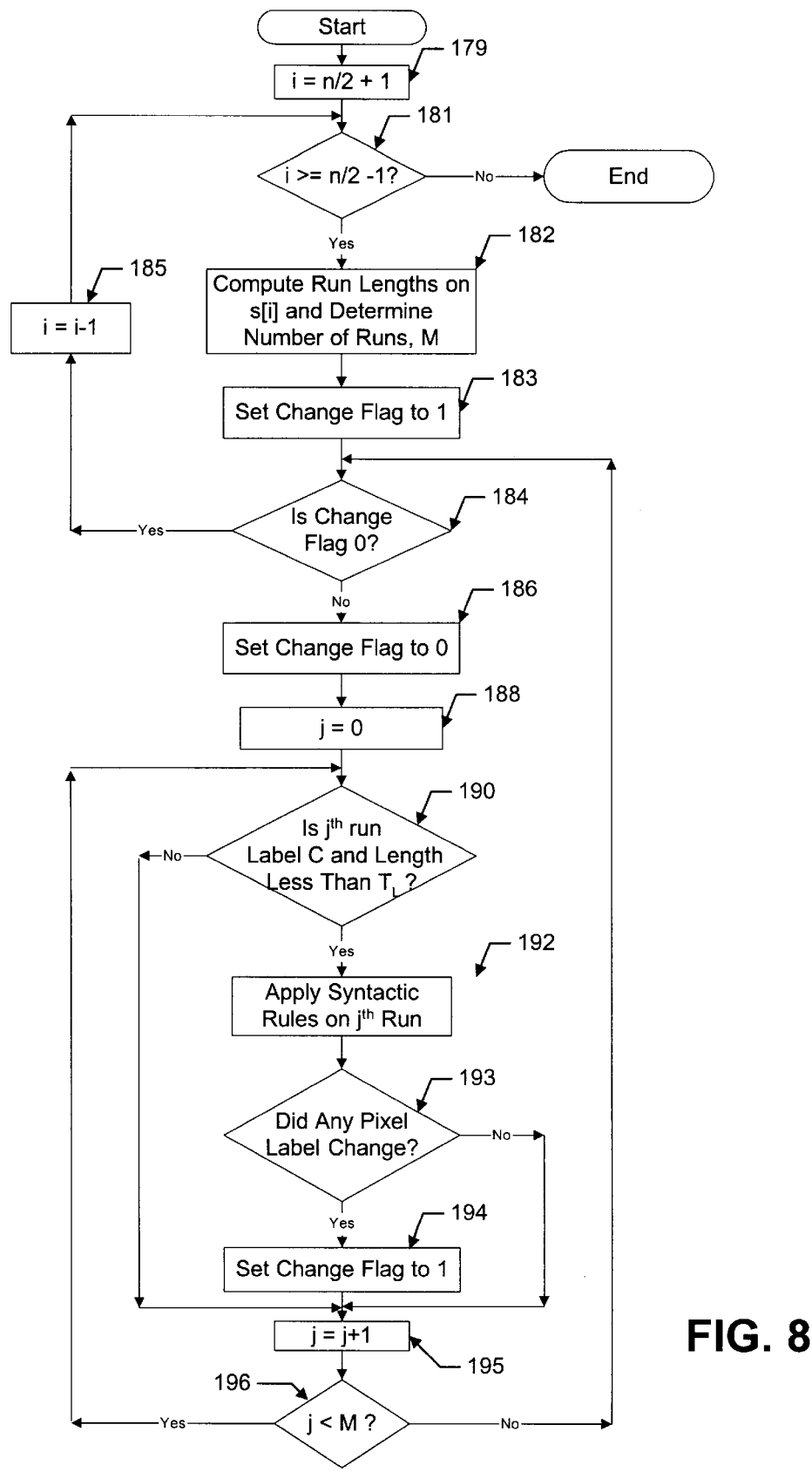
FIG. 8 is a flow diagram illustrating the steps performed to process color pixels.

Referring now to FIG. 8, a flow diagram illustrating the processing of color run lengths is shown. As shown in processing step 179, a row buffer index i is set to a row number that is one larger than the index of the center row. For example, in a system in which seven rows at a time are processed, n is equal to seven and thus in processing step 179 row buffer index i would be assigned a value of four.

In decision block 181, it is determined whether the last of the rows required for processing has been processed. Thus, in the case where seven rows are used and three rows at a time are processed, once the second row is processed processing ends.

If the last of the rows required for processing has not yet been processed, however, then processing proceeds to step 182 where the run lengths in the s buffer 178 (FIG. 7A) are computed for the $i^{th}$ row and the number of runs, M, in that row are determined. Thus in step 182, M runs for a given row are identified.

Next, as shown in processing step 183, a change flag is set to one. The change flag indicates whether any of the labels of the pixels in a given pixel sequence (i.e. a run) have changed. In step 184 the status of the change flag is checked. If the change flag has not been set to zero, as would be the case at the beginning of the processing, in the processing of the fourth row, then processing proceeds to step 186 and the change flag is set to zero.

Processing then continues to step 188 where a counter j is reset. The counter j counts the number of runs in each row and is used to insure that all the runs in a row are visited. Processing then proceeds to step 190 where a decision is made as to whether the $j^{th}$ run is a color run and whether the length of that run is less then a predetermined threshold length $T_L$. If the color run is greater than the threshold length $T_L$, then it is determined that the color run is probably a portion of an image region of the document rather than a text portion of the document and thus the syntactic rules are not applied to that color run.

If the length of the pixel sequence which defines the color run is less than the predetermined length $T_L$, then processing proceeds to step 192 where syntactic rules are applied to the $j^{th}$ run. The syntactic rules are enumerated herein below.

After application of the syntactic rules, the processing proceeds to decision block 193 where decision is made as to whether any pixel labels changed as a result of the application of the syntactic rules. If no pixel labels changed, then processing flows to step 195 where the counter j is incremented. Decision block 196 implements a loop to insure that all of the M runs in the $i^{th}$ row are visited.

If all of the M runs in the $i^{th}$ row are visited, then processing flows to decision block 184 where the change flag is examined. If the change flag has a value equal to a first predetermined value, here zero, this indicates that no pixel labels have changed as a result of application of the syntactic rules and processing flows to step 185 where the row buffer index i is decremented. The row buffer index i is decremented rather than incremented because it is desirable to process the rows in the reverse of the scanning order. For example, it is necessary to process the fourth row in the row buffer prior to processing the third row of the buffer.

The pixel classification process may label blurred pixels surrounding the text pixels as color pixels. Therefore these pixels require further thresholding. Generating accurate segmentation results and sharp characters require labeling of these pixels as either BLACK or WHITE. To achieve this goal the set of syntactic rules enumerated below were developed based upon the types and the length of the runs of BLACK, WHITE and COLOR pixel labels are applied to the labeled pixels.

For each run length two types of information is recorded. The first one is the run type, i.e. COLOR, WHITE, BLACK, and the second one is the length of the run. There is no need to store the initial position of the run length, this information can be extracted from the length of the runs. The maximum number of different runs for a given image row of length N will be N. The run lengths of the pixel labels provide information regarding the content of the current image scan line.

The rules enumerated hereinbelow were developed from observations of sequences of pixel labels. For example, when an image scan line containing characters is traversed from one end to another, one may observe a sequence of pixels in the following order: WHITE, COLOR and BLACK (which may be denoted W B C). Such a sequence may indicate a transition from a white background to a text character in that scan line.

Similarly, one may observe a sequence of pixels in the following order: BLACK, COLOR and WHITE. Such a sequence may indicate a transition from a text pixel to a white background. Based on similar observations, five different syntactic rules have been constructed.

A sequence of pixels (also referred to as a pixel run) i having a pixel label R may be denoted as $R^i$ where the pixel label is one of a color label C, a black label B or a white label W. Thus R belongs to the set of color C, black B and white W which may be expressed in equation form as:

$$R \in \{C, B, W\}$$

The length of a sequence of pixels is denoted by l where:

$$l \in \{x^+, x^-\}$$

in which $x \in N$;

$x^+$ denotes that the length of the run is greater than or equal to x; and $x^-$ denotes that the length of the run is less than or equal to x.

Thus, run i with label R and length l is denoted by $R_l^i$.

The run length under investigation is denoted by bolding the label e.g. R. Thus in the case where a sequence of pixels having a color label is being investigated, the pixel sequence having the color labels would be denoted C.

If a run which has been labeled as a color run C satisfies one of the five rules below, all of the pixels in the sequence of pixels are thresholded based on their L* value and the labels associated with the pixels in the sequence are changed to either B or W.

The five rules defined below are provided with certain length values such as $2^+$, $2^-$ etc. It should be noted that these particular lengths are selected for a scanning resolution of 360 dpi and that other lengths may be preferred for other scanning resolutions. It should also be noted that other rules can also be generated by using run types and lengths depending on the characteristics of the image.

Rule 1

Rule 1 determines if there is transition from white background to black text.

if $((W_2{}^{i-3}C_2{}^{i-2}W_1{}^{i-1}$ or $W_2{}^{i-3}B^{i-2}W_1{}^{i-1}$ or $W_2{}^{i-1})C_{10}{}^{-i}B_2{}^{i+1}C_2{}^{i+2}W_2{}^{i+3}$ or $W_2{}^{i-3}C_2{}^{i-2}W_1{}^{i-1}$ or $W_2{}^{i-3}B^{i-2}W_1{}^{i-1}$ or $W_2{}^{i-1})C_{10}{}^{-i}B_2{}^{i+1}W_2{}^{i+2})$ then pixels in C run are thresholded based on their L* values.

Rule 2

Rule 2 is the complement of Rule 1 in that Rule 2 is used to detect the transition from a black text to a white background.

if $(W_2{}^{i-3}C_2{}^{i-2}B_2{}^{i-1}C_{10}{}^{-i}(W_2{}^{i+hu}{}^{i+1}$ or $W_1{}^{i+1}B^{i+2}W_2{}^{i+3}$ or $W_1{}^{i+1}C_2{}^{i+2}W_2{}^{i+3})$ or $W_2{}^{i-2}B_2{}^{i-1}C_{10}{}^{-i}(W_2{}^{i+1}$ or $W^{i/i+}{}_1B^{i+2}W_2{}^{i+3\ or\ W}{}_1{}^{i+1}C_2{}^{i+2}W_2{}^{i+3}))$ then pixels in C run are thresholded based on their L* values.

Rule 3

Rule 3 detects color runs that are at the tip of characters.

if $(W^{i-1}C_{30}{}^{-i}W^{i+1})$, then check two adjacent upper and lower rows. If there are overlapping black runs on either of upper rows and overlapping white runs on either of lower runs, or overlapping black runs on either of lower runs and overlapping white runs on either of upper runs, or overlapping black runs on either of upper runs and overlapping black runs on either of lower runs, than the pixels of the C run are thresholded based on their L* values.

Rule 4

Rule 4 detects if a color run is within a character.

if$(W_2{}^{i-2}B^{i-1}C_{30}{}^{-i}B^{i+1}$ or $W_2{}^{i-3}C^{i-2}B^{i-1}C_{30}{}^{-i}B^{i+1}$ or $B^{i-1}C_{30}{}^{-i}B^{i+1}W_2{}^{i+2}$ or $B^{i-1}C_{30}{}^{-i}B^{i+1}C^{i+2}W_2{}^{i+3})$ then pixels in C run are thresholded based on their L* values.

Rule 5

This rule is applied if none of the above rules are applicable. Rule 5 computes the number of B, W, and C pixels in a given 5×5 window. If the number of black pixels is larger than color pixels and the number of white pixels is larger than color pixels, then color pixel at the center of the window is thresholded based on its L* value.

In FIG. 8A, for example, a 5×5 window 197 is applied to a color run 198 having a pixel 199 at the center thereof. If the number of black pixels B in window 197 is larger than the number of color pixels C in window 197 and the number of white pixels W in window 197 is larger than the number of color pixels C, in window 197, then the color pixel 199 at the center (e.g. the unshaded dot 198 FIG. 8A) of the kernel is thresholded based on its L* value. The shaded dots in FIG. 8A can have labels B, W, or C.

This operation is repeated by shifting the kernel until it covers the last element of the color run.

It should be noted that in rules one-five above, some of the runs do not have any length sub-index. This indicates that the rule is independent of that run's length. It should also be noted that since some of the rules are applied to pixel labels adjacent to the image row presently being processed, the adjacent rows must be processed prior to the processing of the current row. For this reason, to process row n on buffer s, row n−1 is processed prior to row n. After processing row n, row n+1 is processed. This enables pixels on row n+1 to verify their labels based on the changes on rows n and n−1. This process is shown in FIG. 8.

The length of the runs given above for five syntactic rules are for documents scanned at a scanning resolution of 360 dpi. Those of ordinary skill in the art will appreciate of course that other lengths may preferably be selected for other scanning resolutions. The selection of particular lengths used in any application may depend upon a variety of factors including but not limited to scanning resolution of the document, font type and font size.

Figure 9:
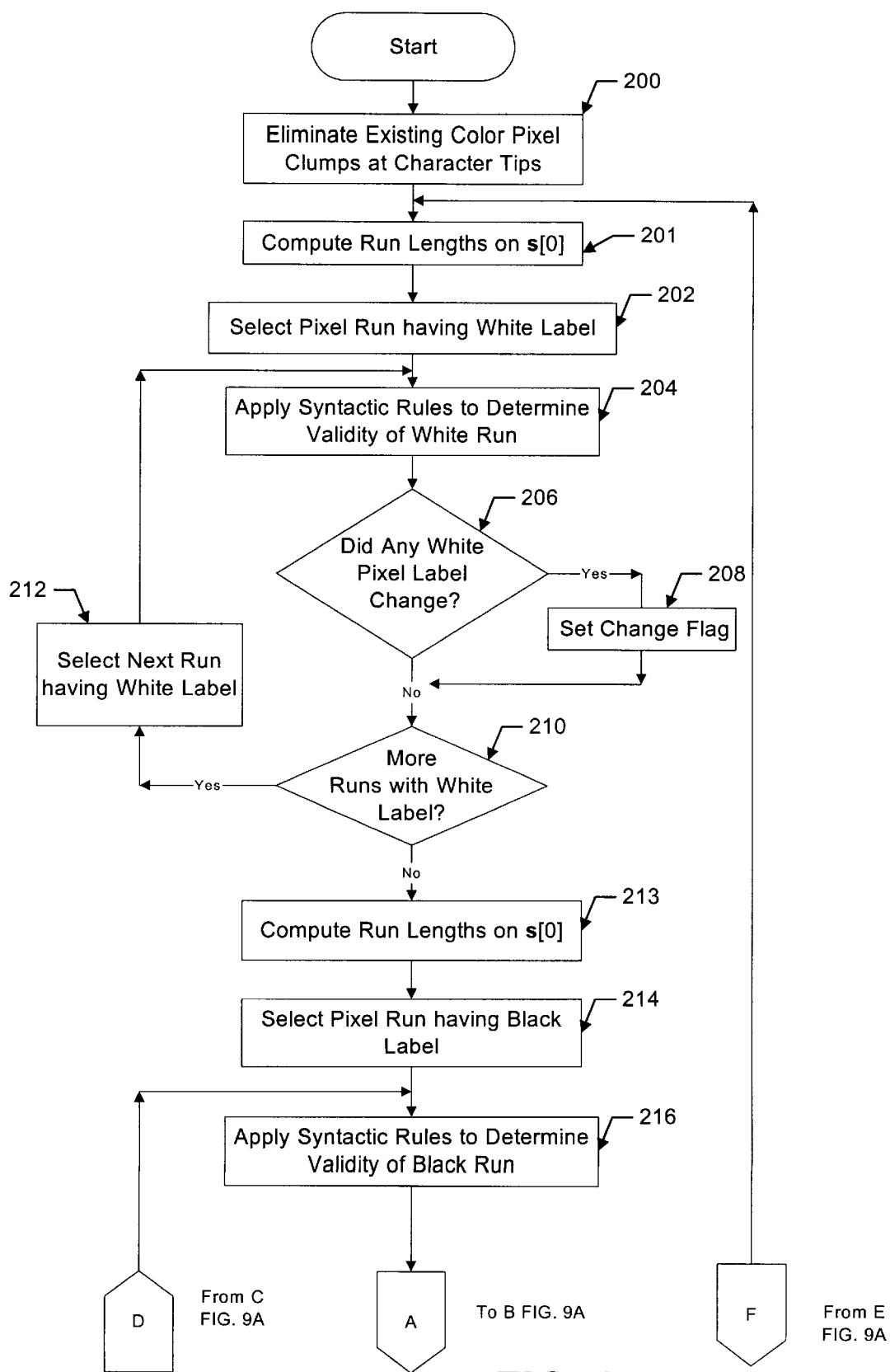
FIGS. 9 and 9A are a series of flow diagrams illustrating the steps performed to post-process black and white pixels.
Figure 9A:
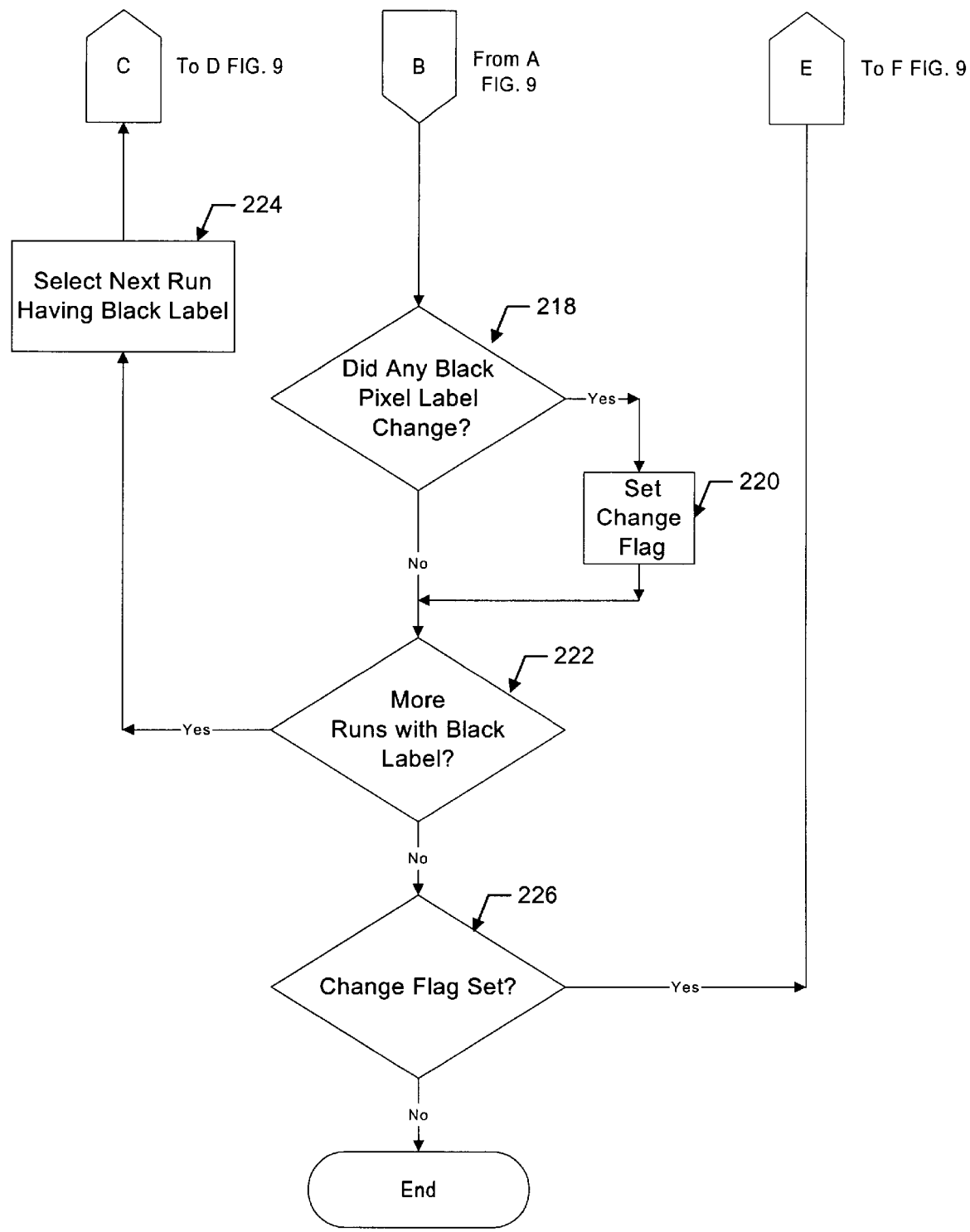

Referring now to FIG. 9, a flow diagram of the steps to post process black and white pixels is shown.

This post processing operation also corrects the pixel mis-classifications committed by the pixel classification operation and by the color pixel post-processing operation described above in conjunction with FIGS. 8 and 8A. The post-processing of black and white pixels ideally converts the black and white pixels to color pixels within image regions of the document. In general, the erroneous occurrence of black pixels in the document image region is more noticeable than the erroneous occurrence of white pixels in the document image region. It should be noted, however, that even if some of pixels are mis-labeled (e.g. an image pixel receives a white label) and the mislabeling is not able to be corrected, the impact on the printed document images is relatively small because the techniques described herein are pixel based and thus degradations occur gracefully. Post-processing of both black and white pixels is performed in accordance with syntactic rules that are based on the run lengths of pixels having a C label, a B label and a W label.

Post-processing of black and white pixels is facilitated with the use of three image buffers that are the first two rows of the s buffer, s[0] and s[1] in FIG. 7A, and the image row most recently transferred out of memory location s[0] into memory location d[0], 176 (FIG. 7A). Memory location s[0] contains the image row that will be pushed out of the buffer after post-processing of black and white pixels. A plurality of syntactic rules enumerated below are used to determine the validity of the black and white pixels in memory location s[0] of s buffer 178.

It is desirable to apply the syntactic rules only within the image regions of a mixed document. Accordingly it should be noted that the rules have been developed to locate the black and white runs within image regions of the mixed document.

As shown in processing step 200, processing begins by eliminating color pixel clumps which exist at the tips of characters. This step is performed prior to post-processing the desired white and black runs and is accomplished by applying the rule five of the color post-processing operation described above in conjunction with FIG. 8A to color runs having a length which is less than a predetermined threshold length. The threshold length is empirically selected and for images having a resolution of about 360 dots-per-inch (dpi) the threshold length is selected to be ten.

It should be noted, however, that any threshold length which allows the elimination of color pixel clumps which exist at the tips of characters can also be used. The particular threshold length is selected in accordance with a variety of factors including but not limited to the image resolution.

It should also be noted that with the above mentioned, threshold lengths and memory buffer sizes, and more importantly since post-processing is implemented on three image rows, the kernel size is changed from 5×5 to 3×5. Processing then flows to step 201 in which run lengths are computed on each of the segmentation labels stored in the first row s[0] of buffer 178 in which pixel segmentation labels for the image rows are stored.

Processing next flows to step 202 in which a pixel run having a white label is selected. Then, as shown in processing step 204, a plurality of syntactic rules are applied to the selected pixel run having the white label. The syntactic rules are applied to the white label pixel runs having a length less than length $T_w$ to determine if the white run occurs in an image region of the document. This is accomplished by checking the length of the neighboring color runs and by checking the L* values of the pixels in the current white run. The white runs may also be generated within the color characters. Pixel runs having a white label and which exist within a color character should not have their labels converted from white labels to color labels even though they are surrounded by color runs. Conversion of these white runs to color runs generate perceptually disturbing segmentation results. For example, assume that a document includes colored text (e.g. red text) printed on a white or light background. In that case, the pixel labels taken through a horizontal axis of a letter such as the letter "O" would appear as follows: . . . WCCWWWCCW . . . In this case, the white pixels designated with a bolded label i.e. W should not be changed from white labels to color labels. If such a change were made, then the center portion of the character "O" would no longer be white thus producing perceptually poor quality segmentation result.

The above pixel label conversions are accomplished by application of the following rule:

if ($C_{30+}^{i-1} W^i$ or $W^i C_{30+}^{i+1}$ or $C_{30+}^{i-2} B^{i-1} W^i$ or $W^i B^{i+1} C_{30+}^{i+2}$ or $C_{30+}^{i-3} B^{i-2} C^{i-1} W^i$ or $W^i C^{i+1} B^{i+2} C_{30+}^{i+3}$)

if ($C_{3+}^{i-1} W_2^i - C_{3+}^{i+1}$)

then pixel labels in W run are changed to C else if ($C^{i-3} W_9^{i-2} C_9^{i-1} W_{30-}^i C_9^{i+1} W_9^{i+2} C^{i+3}$)

then pixel labels in W run are changed to C else if ($C^{i-1} W^i C^{i+1}$)

then for each pixel p in W run do if $L^*(p) < T_C$ then p's pixel label is changed to C else if ($C_{10+}^{i-1} W^i B^{i+1} C^{i+2}$ or $C^{i-2} B^{i-1} W^i C_{10+}^{i+1}$ or $C_{10+}^{i-1} W_{3-}^i B^{i+1}$ or $B^{i-1} W_{3-}^i C_{10+}^{i+1}$)

then pixel labels in W run are changed to C else if ($C^{i-1} W_{2-}^i C^{i+1}$ or $B^{i-1} W_{2-}^i C^{i+1}$ or $C^{i-1} W_{2-}^i B^{i+1}$)

then for each pixel p in W run do if $L^*(p) < T_C$ then p's label is changed to C The threshold $T_C$ has a value equal to the threshold value of $T_{W_2}$ defined above in conjunction with FIG. 6 describing the pixel classification scheme.

Processing then proceeds to decision block 206 where a decision is made as to whether or not any white pixel labels changed as a result of the application of the syntactic rules. If any pixel labels changed then as shown in processing block 208 a change flag is set.

If on the other hand no pixel labels changed, then the change flag is not set and processing flows directly to decision block 210 and processing block 212 which implement a loop in which the syntactic rules are applied to each white label run in s[0].

Once the syntactic rules have been applied to all of the pixels runs having the white label, processing flows to processing block 213 in which run lengths on s[0] are recomputed then block 214 selects a pixel run having a black label. Next, as shown in processing step 216, a plurality of syntactic rules are applied to the selected pixel run having the black label. The syntactic rules applied to the pixel runs having the black label determine if the black run occurs in an image region of the document.

This is accomplished by checking the length of the color runs neighboring the selected black run. If the neighboring color runs are longer than a pre-selected length, or if a black run does not have any white runs in its two immediate left and right neighboring runs, then labels of the pixels in black run are changed from black B to color C. The above label conversions for pixel runs having a black label are set forth as:

if ($C_{10+}^{i-1} B^i$ or $B^i C_{10+}^{i+1}$ or $C_{30+}^{i-2} W_9^{i-1} B^i$ or $B^i W_9^{i+1} C_{30+}^{i+2}$ or $C_{30+}^{i-3} X_9^{i-2} C_9^{i-1} B^i$ or $B^i C_9^{i+1} X_9^{i+2} C_{30+}^{i+3}$ or $B^{i-2} C^{i-1} B^i C^{i+1} B^{i+2}$)

if ($C^{i-1} B^i C^{i+1}$ or $W^{i-1} B^i C^{i+1}$ or $C^{i-1} B^i W^{i+1}$ or $C^{i-2} W^{i-1} B^i W^{i+1} C^{i+2}$)

then pixel labels in B run are changed to C else if $C_{3+}^{i-2} W^{i-1} B_{3+}^i W^{i+1} C_{3+}^{i+2}$ then for each pixel p in B run do if p's two neighbors, which are located in buffers d[0] and s[1] at the same location, are both have labels C, or one of them is C and the other is W then change p's label to C The run labeled X shown above denotes either a black run B or a white run W.

The length of the runs given above for black and white pixel verification are for documents scanned at a scanning resolution of 360 dpi. Those of ordinary skill in the art will appreciate of course that other lengths may preferably be selected for other scanning resolutions. The selection of particular lengths used in any application may depend upon a variety of factors including but not limited to scanning resolution of the document, font type and font size.

It should be noted that other syntactic rules can be generated based on the images of interest. For example, a particular set of mixed color documents which include a particular class of images (e.g. beach scenes) may require a customized set of syntactic rules for optimum operation. Such rules, however, still depend on run lengths and labels. Alternatively, a set of mixed color documents having colored text or a particular background color may also be processed more efficiently by customizing the syntactic rules accordingly. It may also be desirable to modify or change the syntactic rules in response to changes in font style (e.g. italics), font size or document resolution. The rules herein provided, however, satisfy a wide variety of mixed color documents.

After application of the syntactic rules to pixels having white labels, processing proceeds to decision block 218 where decision is made as to whether or not any black pixel labels changed as a result of the application of the syntactic rules. If any pixel labels changed then as shown in processing block 220 a change flag is set.

If, on the other hand, no pixel labels changed then the change flag is not set and processing flows directly to decision block 222 and processing block 224 which implement a loop in which the syntactic rules are applied to each black label run in image regions of the document.

Once the syntactic rules have been applied to all of the pixels runs having the black label, processing flows to decision block 226 which determines if a change flag was set during the processing of white and black pixel runs. If a change flag was set, then processing loops back to step 201 and the process is repeated until no change flags are set due to application of the syntactic rules to the white and black pixel runs.

Referring now to FIGS. 10 and 10A, one technique for processing vertical runs of pixels is explained. Before transferring the pixels stored in the first row s[0] of buffer 178 (FIG. 7A) into row d[0] of buffer in 176 (FIG. 7A) as described in processing step of FIG. 6A, color pixels of row s[0] of buffer 178 are used to generate vertical color runs (i.e. columns of pixel sequences). These runs keep the history of the color pixels at each pixel location of the post-processed document row. This information is used to determine how far the image regions from text and background regions of s[0] buffer and the information can be used during the post-processing of the black and white pixels.

The same type of vertical runs can be computed for white and black pixels. The vertical runs can be computed very efficiently by allocating eight bits to each pixel location and for each color pixel at row n label l can be inserted to the vertical run. This process is illustrated in below figure. It should be noted that although the example here discussed utilizes eigth bits, those of ordinary skill in the art will aprreciate that greater or fewer than eight bits may be used. For example, the length of the runs can be increased to gather more information regarding the previously post-processed rows.

FIG. 10 shows the vertical runs 230, 232 corresponding to pixel positions i and i+1 on row n designated 234. Document row n which is in buffer s[0] has two color pixels that are indicated by two ls at pixel locations i and i+1 designated 230a, 232a. The vertical run at location i denotes that there were three consecutive color pixels at the same location on rows n-1, n-2 and n-3, and 3 consecutive non-color pixels at the same location on rows n-4, n-5, and n-6.

FIG. 10A illustrates the process after updating the vertical runs 230, 232 with the pixel labels of the row n. As shown in FIG. 10A both vertical runs 230, 232 are shifted one location and the new labels are inserted into index location 1 of the vertical runs. Vertical runs enable the system to remember recently processed rows, and increase the accuracy of the post-processing operations.

As indicated heretofore, aspects of this invention pertain to specific "methods" and "method functions" implementable on computer systems. Those of ordinary skill in the art should readily appreciate that computer code defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method of processing a mixed document defining a plurality of pixels, the method comprising the steps of:
   (a) detecting a first set of the pixels corresponding to image pixels;
   (b) detecting a second set of the pixels corresponding to large text pixels;
   (c) computing, in a first color space, a first value corresponding to a white point of a media on which the document is printed;
   (d) computing, in the first color space, a second value corresponding to a black point of the media;
   (e) generating, via the first value, a table of values that are compensated for the white point of the media;
   (f) labeling, via the table of values, each of the pixels in the document with one of:
      (1) a color label;
      (2) a black label; and
      (3) a white label; and
   (g) applying a plurality of syntactic rules to pixel sequences having predetermined labels and predetermined lengths.

2. The method of claim 1 wherein prior to step (a), the method further comprises the step of generating a low resolution mixed document.

3. The method of claim 2 wherein the step of generating a low resolution document further comprises the steps of:
   scanning an original document a first time to provide a first document having a first resolution; and
   scanning the original document a second time to provide a second document having a second different resolution wherein the first resolution is lower than the second resolution.

4. The method of claim 2 wherein the step of generating a low resolution document further comprises the steps of:
   scanning the document with a scanner to provide a high resolution document having a first resolution; and
   subsampling the first scanned document to provide a low resolution document having a second resolution wherein the second resolution is less than the first resolution.

5. The method of claim 2 further comprising the steps of:
   labeling image pixels in the low resolution document; and
   labeling large text pixels in the low resolution document.

6. The method of claim 5 further comprising the steps of:
   partitioning, via the image pixel labels and the large text pixel labels, the image region of the mixed document into at least one foreground region and at least one background region; and
   identifying first portions of at least one foreground region which corresponds to a text region and second portions of at least one foreground region which corresponds to an image region.

7. The method of claim 6 wherein the step of partitioning the document includes the steps of bi-level thresholding the pixels in the low resolution document.

8. The method of claim 7 wherein the step of identifying first portions of at least one foreground region which corresponds to a text region and second portions of at least one the foreground region which corresponds to an image region includes the steps of:

computing connected components in the foreground region; and computing bounded boxes of the connected components in the foreground region.

9. The method of claim 8 further comprising the steps:

computing the size of at least one of the connected components in each of the at least one foreground regions;

computing bounding box dimensions of at least one of the connected components in each of the at least one foreground regions; and labeling pixels within a connected component as large text pixels in response to the component size of the connected component having a value within a first predetermined range of values and the bounding box dimensions of the connected component having a value within a second predetermined range of values.

10. The method of claim 7 further comprising the steps of:

mapping a first pixel group having a first label in the mixed document to a first pixel having the first label in the low resolution document;

defining a pixel window in the low resolution document, wherein the pixel window surrounds the first pixel in the low resolution document;

in response to a pixel having a second different label existing in the pixel window surrounding the first pixel in the low resolution document, then performing the step of:

changing the label of the first pixel in the low resolution document from the first label to the second label.

11. The method of claim 10 wherein the first label corresponds to a black label and the second label corresponds to a color label.

12. The method of claim 2 wherein the pixel sequences correspond to a column of the mixed document and the low resolution document is centered within the pixel window.

13. The method of claim 1 wherein the pixel sequences correspond to rows of the mixed document.

14. The method of claim 1 wherein:

the first color space is an RGB color space;

the white point corresponds to an RGB triplet in the RGB color space;

the black point corresponds to an RGB triplet in the RGB color space; and the media is a sheet of paper.

15. The method of claim 1 further comprising a method for post processing color run lengths in the mixed document, the mixed document being a mixed color document and having a plurality of pixel sequences, each of the pixel sequences having a plurality of pixels, the post processing method comprising the steps of:

(h) selecting a sequence of pixels;

(i) computing a run length value of the selected pixel sequence;

(j) comparing the run length value of the selected pixel sequence to a threshold run length value;

(k) in response to the run length value of the selected pixel sequence being less than the threshold run length value performing the steps of:

(1) applying a plurality of syntactic rules to the selected pixel sequence;

(2) changing a label of a pixel in the selected pixel sequence in response to at least one of the syntactic rules;

(l) repeating steps (i)–(k) in response to at least one pixel label changing.

16. The method of claim 15 wherein the post processing method further comprising the steps of:

in response to no pixel label changing, repeating steps (h)–(l) for a next one of the plurality of pixel sequences.

17. The method of claim 1 further comprising a method for processing a plurality of pixel sequences in the mixed document, each of the pixel sequences having a label, the pixel sequences processing method comprising the steps of:

(m) selecting a pixel sequence from the plurality of pixel sequences;

(n) computing a run length value of the selected pixel sequence;

(o) comparing the run length value of the selected pixel sequence to a threshold run length value;

(p) in response to the run length value of the selected pixel sequence being less than the threshold run length value, performing the steps of:

(1) applying a syntactic rule to the selected pixel sequence to eliminate a group of color pixels existing at a tip of a text character in the mixed document;

(q) repeating steps (m)–(p) for each of the plurality of pixel sequences in the mixed document;

(r) determining if a white run in one of the plurality of pixel sequences is in an image region of the mixed document;

(s) changing the white run to a color run in response to the white run being in an image region of the mixed document;

(t) determining if a black run in the one of the plurality of pixel sequences is in an image region of the mixed document; and (u) changing the black run to a color run in response to the black run being in an image region of the mixed document.

18. The method of claim 17 wherein the step of determining if a white run is in an image region comprises the steps of:

determining the length of color runs neighboring the white run;

comparing the length of color runs neighboring the white run to a predetermined threshold value;

in response to the length of the color runs neighboring the white run being greater than the predetermined threshold value, changing the labels of each of the pixels in the white run from a white label to a color label; and for each of the pixels in the selected white run, checking a value corresponding to a luminance pixel value.

19. The method of claim 17 wherein the one of the plurality of the pixel sequences corresponds to one of a vertical pixel sequence and a horizontal pixel sequence.

20. The method of claim 17 wherein steps (t) and (u) comprise the steps of:

determining the length of color runs neighboring the black run;

comparing the length of color runs neighboring the black run to a predetermined threshold value; and in response to the length of the color runs neighboring the black run being greater than the predetermined threshold value, changing the labels of each of the pixels in the black run from a black label to a color label.

21. The method of claim 17 wherein steps (t) and (u) comprise the steps of:

determining if the any of the two immediate neighbors to the left and to the right of the black run are white; and in response to none of the two immediate neighbors to the left and to the right of the black run being white, changing the labels of the pixels in the black run from black to color.

22. The method of claim 17 further comprising the steps of repeating steps (r)–(u) for each of the plurality of pixel sequences in the mixed document.

23. The method of claim 1 further comprising a method for processing mixed document, the mixed document being a mixed color document and having a plurality of pixels, the mixed color document processing method comprising the steps of:

identifying large text regions of the mixed color document;

identifying image regions of the mixed color document;

labeling pixels in the large text region of the mixed color document with a first one of the labels;

labeling pixels in the image region of the mixed color document with the first one of the labels;

labeling each of remaining plurality of pixels in the mixed color document with a second or third one of the labels;

selecting a sequence of pixels in the document; and applying a first one of the plurality of syntactic rules to predetermined ones of pixels having a first predetermined label in the selected pixel sequence.

24. The method of claim 23 further comprising the step of applying a second one of the plurality of syntactic rules to predetermined ones of pixels having a second predetermined label in the selected pixel sequence.

25. The method of claim 24 further comprising the step of applying a third one of the plurality of syntactic rules to predetermined ones of pixels having a third predetermined label in the selected pixel sequence.

26. The method of claim 24 wherein:

the first label is the color label;

the second label is the white label; and the third label is the black label.

27. The method of claim 26 wherein:

the first plurality of syntactic rules correspond to rules for validating pixels having the color label; and the first predetermined label corresponds to the color label.

28. The method of claim 27 wherein:

the second plurality of syntactic rules correspond to rules for validating pixels having the white label; and the second predetermined label corresponds to the white label.

29. The method of claim 28 wherein:

the third plurality of syntactic rules correspond to rules for validating pixels having the black label; and the third predetermined label corresponds to the black label.

30. An apparatus for segmenting a document comprising:

a large text region identifier to identify large text regions of the document;

an image region identifier to identify image regions of the document;

a document segmentor to label pixels in the large text region and the image region of the document with a first label and to label each of remaining plurality of pixels in the document with a first one of a second label and a third label;

a pixel sequence selector to select a sequence of pixels in the document; and a pixel label validator to apply predetermined ones of a first plurality of syntactic rules to predetermined ones of pixels having a first predetermined label in a pixel sequence selected by said pixel sequence selector, to validate pixel labels of pixels which satisfy the predetermined ones of the first plurality of syntactic rules and to change pixel labels of pixels which do not satisfy the predetermined ones of the first plurality of syntactic rules.

31. The apparatus of claim 30 further comprising a preview document generator having an input port and an output port, said preview document generator coupled to said large text region identifier and to said image region identifier, said preview document generator to receive at the input port thereof a document having a first resolution and to provide at the output port thereof a document having a second resolution wherein the second resolution is lower than the first resolution. coupled to said document segmentor wherein said document segmentor provides a segmented document to said halftone printing system.

32. The apparatus of claim 31 further comprising a halftone printing system coupled to said document segmentor wherein said document segmentor provides a segmented document to said halftone printing system.

33. A color printing system comprising:

a scanner having a scanner color space, said scanner having an input port to receive a mixed color document to be scanned and an output port to provide a stream of bits representing the mixed color document;

a document segmentation system having an input port and an output port, said document segmentor for receiving on the input port thereof the stream of digital bits from the output port of said scanner and to provide at the output port thereof a segmented document bit stream, said document segmentation comprising:

a large text region identifier to identify large text regions of the mixed color document;

an image region identifier to identify image regions of the mixed color document;

a document segmentor to label pixels in the large text region and the image region of the document with a first label and to label each of the remaining plurality of pixels in the document with a one of a second label and a third label;

a pixel sequence selector to select a sequence of pixels in the document; and a pixel label validator to apply predetermined ones of a first plurality of syntactic rules to predetermined ones of pixels having a first predetermined label in a pixel sequence selected by said pixel sequence selector, to validate pixel labels of pixels which satisfy the predetermined ones of the first plurality of syntactic rules and to change pixel labels of pixels which do not satisfy the predetermined ones of the first plurality of syntactic rules; and a printing system, having an input port coupled to the output port of said segmentation processor, said printing system to receive at the input port thereof a stream of bits which represent a segmented mixed color document and to print a mixed color document in response to a segmented document bit stream fed thereto from said segmentation system.

34. The color printing system of claim 33 wherein said document segmentation system further comprises:

a preview document generator having an input port coupled to the output port of said scanner and having an output port coupled to said large text region identifier and to said image region identifier, said preview document generator to receive at the input port thereof a document having a first resolution and to provide at the output port thereof a document having a second resolution wherein the second resolution is lower than the first resolution.

35. A computer program product for use with a color reproduction system including a scanner, a processor and a printer, the computer program product comprising:

a computer useable medium having computer readable program code to identify large text regions and image regions of a mixed color document;

a computer useable medium having computer readable program code to label pixels in the large text region and the image region of the mixed color document with a first label;

a computer useable medium having computer readable program code to label each of remaining plurality of pixels in the mixed color document with a first one of a second label and a third label;

a computer useable medium having computer readable program code to select a sequence of pixels in the mixed color document; and a computer useable medium having computer readable program code to apply a first plurality of syntactic rules to predetermined ones of pixels having a first predetermined label in the selected pixel sequence.

36. The computer program product of claim 35 further comprising:

a computer useable medium having computer readable program code to apply a second plurality of syntactic rules to predetermined ones of pixels having a second predetermined label in the selected pixel row.

37. The computer program product of claim 35 further comprising:

a computer useable medium having computer readable program code to apply a third plurality of syntactic rules to predetermined ones of pixels having a third predetermined label in the selected pixel sequence.

38. The computer program product of claim 36 further comprising:

a computer useable medium having computer readable program code to receive a document having a first resolution and to generate a document having a second resolution wherein the second resolution is lower than the first resolution.

\* \* \* \* \*

UNITED STATES PATENT AND TRADEMARK OFFICE
CERTIFICATE OF CORRECTION

PATENT NO. : 5,956,468
DATED : September 21, 1999
INVENTOR(S) : Hakan Ancin

It is certified that error appears in the above-identified patent and that said Letters Patent is hereby corrected as shown below:

Column 26, lines 20 – 22, delete "coupled to said document segmentor wherein said document segmentor provides a segmented document to said halftone printing system.".

Signed and Sealed this

Twenty-fifth Day of April, 2000

Attest:

Attesting Officer

Q. TODD DICKINSON

Director of Patents and Trademarks